United States Patent

Weigel

[15] 3,650,413

[45] Mar. 21, 1972

[54] AUTOMATIC TAPE CARTRIDGE CHANGING MECHANISM

[72] Inventor: Morton L. Weigel, Bloomington, Ind.

[73] Assignee: Sarkes Tarzian, Inc., Bloomington, Ind.

[22] Filed: Sept. 25, 1969

[21] Appl. No.: 861,207

Related U.S. Application Data

[63] Continuation of Ser. No. 389,014, Aug. 12, 1964, abandoned.

[52] U.S. Cl. ..........................274/4 F, 179/100.2 Z, 242/57, 242/181, 242/186, 242/199, 274/4 D

[51] Int. Cl. ..................G11b 5/00, G11b 15/24, G11b 23/04

[58] Field of Search ..........................179/100.2 Z, 100.2 MI; 242/55.12, 55.13; 274/4, 11

[56] References Cited

UNITED STATES PATENTS

| | | | |
|---|---|---|---|
| 2,676,022 | 4/1954 | Roberts | 274/4 |
| 2,821,576 | 1/1958 | Gaubert | 179/100.2 |
| 3,080,679 | 3/1963 | Hardigan | 46/232 |
| 3,317,212 | 5/1967 | Tatter et al. | 274/11 |
| 3,453,397 | 7/1969 | Miller et al. | 179/100.2 |

*Primary Examiner*—Bernard Konick
*Assistant Examiner*—J. Russell Goudeau
*Attorney*—Mason, Kolehmainen, Rathburn and Wyss

[57] ABSTRACT

A removable or detachable magazine is provided which receives and stores a plurality of flat rectangular magnetic tape cartridges. Each cartridge is provided with two reels on which a short length of tape is wound, the ends of the tape being secured to the reels. An automatic cartridge changing mechanism is provided with a magazine receiving well into which the loaded magazine may be placed with either one of two orientations. When the magazine is placed in the well in one orientation a driveshaft is positioned within the central aperture of one group of reels of the cartridges positioned within the magazine, and when the magazine is positioned with the reverse orientation, the driveshaft is positioned within the central apertures of the other reel in each cartridge.

When the end of a particular tape is reached, means are provided responsive to the increase in tension in the tape for initiating an automatic tape changing cycle during which the transducer head is automatically withdrawn from the tape which has been played, the magazine is moved upwardly in the well to position another cartridge for engagement by the driveshaft, and the transducer head is then moved into engagement with the new tape which is wound on the reel surrounding the driveshaft during the next playing cycle. This automatic changing cycle takes place within approximately one second and without rewinding the tape in the previously played cartridge. The magnetic tape cartridges which are positioned within the magazine are thus played in rapid succession in the order in which they are placed in the magazine.

A tape cartridge reject means is provided for manually shifting from one magnetic tape cartridge to another at any time so that if the user does not wish to start or continue playing one cartridge he may manually reject this tape and immediately bring the next tape cartridge into playing position, in a manner comparable to the manual reject action of a conventional disc record changer.

The magazine is locked in its selected position in the well at all times during which the transducer head is in contact with one of the cartridges so as to prevent inadvertent movement of the tape while the head is in engagement therewith. However, when all of the cartridges in the magazine have been played, the transducer head is moved away from the tape in the last cartridge, the machine is automatically turned off, and an indication is made that the magazine may be bodily removed from the machine. The magazine may now be inserted into the well with the opposite orientation so that the driveshaft is arranged to rewind the tapes within the respective cartridges back onto the reels on which they were originally wound. The selections on the other sound channel of each cartridge are thus each played in rapid succession but in the reverse order.

104 Claims, 31 Drawing Figures

INVENTOR

Morton L. Weigel

BY

Mason, Kolehmainen, Rathburn & Wyss

Att'ys

INVENTOR.
Morton L. Weigel
BY
Mason, Kolehmainen, Rathburn & Wyss
Att'ys

INVENTOR.

Morton L. Weigel

BY

Mason, Kolehmainen, Rathburn & Wyss

Attys

INVENTOR.
Morton L. Weigel
BY
Mason, Kolehmainen, Rathburn & Wyss
Att'ys

INVENTOR.
Morton L. Weigel
BY
Mason, Kolehmainen, Rathburn & Wyss
Att'ys

INVENTOR.
Morton L. Weigel
BY
Mason, Kolehmainen, Rathburn & Wyss
Att'ys

INVENTOR
Morton L. Weigel
BY
Mason, Kolehmainen, Rathburn & Wyss
Att'ys

INVENTOR.

Morton L. Weigel

BY

Mason, Kolehmainen, Rathburn & Wyss

Att'ys

INVENTOR.
Morton L. Weigel
BY
Mason, Kolehmainen, Rathburn & Wyss
Attys

INVENTOR.
Morton L. Weigel
BY
Mason, Kolehmainen, Rathburn & Wyss Attys

PATENTED MAR 21 1972 3,650,413

INVENTOR.

Morton L. Weigel

BY

Mason, Kolehmainen, Rathburn & Wyss
Attys

INVENTOR
Morton L. Weigel
BY
Mason, Kolehmainen, Rathburn & Wyss, Att'ys

AUTOMATIC TAPE CARTRIDGE CHANGING MECHANISM

This application is a continuation of application Ser. No. 389,014, filed Aug. 12, 1964, now abandoned.

The present invention relates to apparatus for reproducing or recording on magnetic tape contained in individual tape cartridges and, more particularly, to an arrangement for automatically changing from one tape cartridge to another.

While the automatic tape cartridge changing mechanism of the present invention will be described in connection with an arrangement for the playing or playback of prerecorded tape within the cartridges, it will be understood that the arrangement of the present invention is equally applicable to recording as well as playback operations insofar as the function of the automatic cartridge changing mechanism is concerned. Accordingly, when reference is made to the playing of magnetic tapes in the following portions of this specification and claims, it will be understood that this language applies equally well to recording as well as playback operations. In the art of magnetic tape recording and reproducing apparatus, the trend has been to provide reels of tape which are sufficiently large to permit recording or reproducing a relatively large number of selections over a period of from 30 minutes to over an hour. While such arrangements have the advantage of storing a large number of selections or other information in compact form, they necessarily suffer from the disadvantage that selection of a particular item for reproduction at a particular place on the tape is quite involved and time-consuming. In an effort to alleviate this disadvantage many arrangements have been proposed for turning the reels at high speed until the approximate location of the desired selection is reached so as to cut down the time required to find a particular section. However, these arrangements do not have the flexibility of the conventional disc record automatic changer wherein a group of records each containing an individual selection which lasts from 3 to 5 minutes, may be placed on the spindle of the record changer in any desired order and played successively in this order in a fully automatic manner. This flexibility in the selection of individual pieces, and also the relatively brief period required to change from one record to another has in large measure been responsible for the continued popularity of disc records and the failure of the magnetic tape recording and reproducing art to displace such records.

While certain arrangements heretofore proposed have attempted to provide an arrangement for automatically changing from one magnetic tape to another, these arrangements are not likely to displace the disc record changer for the simple reason that they do not offer the ease of selection, simplicity of operation and rapid change cycle characteristics of the conventional automatic disc record changer. One such prior art arrangement, for example, is shown in Goodell et al. U.S. Pat. No. 3,100,090 wherein a group of magnetic tape cartridges are played in succession by successively pulling out the tape from each single reel cartridge and winding it on a common takeup spool by means of a conventional capstan drive during the actual recording or playback operation. A similar prior art arrangement is described in an article entitled Compatible Cartridges for Magnetic Tapes by Marvin Camras, which appeared in IRE Transactions on Audio for Sept. – Oct. 1960, pp. 178–184. In these arrangements, after the tape has been wound on the takeup spool, it is rewound back onto the spool in the cartridge before the mechanism changes to the next cartridge. An arrangement is provided for searching for a particular selection on one of the tapes by moving the tape at high speed in either direction during the playing cycle. While the arrangement described in the Goodell et al. U.S. Pat. No. 3,100,090 is alleged to embody all of the advantages of conventional disc record changer mechanisms, this arrangement requires a much longer time to change from one tape cartridge to another, due to the time required for the rewinding operation, and also does not provide for instantaneous selection of individual pieces or rearrangement thereof in any desired order as can be done in the disc record changer.

It is, therefore, a primary object of the present invention to provide a new and improved apparatus for automatically changing magnetic tape cartridges which provides the same flexibility of operation and ease of selection as a conventional automatic disc record changer.

It is another object of the present invention to provide a new and improved mechanism for automatically playing a series of magnetic tape cartridges wherein a change from one cartridge to another is accomplished in a very short period of time.

It is a further object of the present invention to provide a new and improved magnetic tape cartridge changing mechanism which is capable of playing a plurality of magnetic tape cartridges in rapid succession without rewinding any of the tapes.

It is a still further object of the present invention to provide a new and improved magnetic tape cartridge changing arrangement which is capable of automatically playing a plurality of magnetic tape cartridges in succession by direct drive engagement with the tape reels in successive cartridges.

It is another object of the present invention to provide a new and improved magnetic tape cartridge changing arrangement which is capable of playing a group of plural signal magnetic tapes in rapid succession in one order to play one signal information portion on each tape and is capable of playing these tapes in rapid succession in the reverse order to play another signal information portion on each tape.

A further object of the present invention is to provide a new and improved magnetic tape cartridge player having means for automatically playing tapes within a plurality of cartridges in succession and means responsive to an increase in tension when the end of the tape being played is reached for automatically adjusting the mechanism to play the next tape in said succession.

A still further object of the present invention resides in the provision of a new and improved magnetic tape cartridge changing mechanism for successively changing a group of magnetic tapes in a predetermined sequence, said mechanism having a transducer head and means responsive to an increase in tension when the end of each tape is reached for moving the head into engagement with the next tape in said sequence.

A still further object of the present invention resides in the provision of a new and improved magnetic tape cartridge changing machine wherein cartridges may be placed in the machine in either of two orientations and facilities are provided for automatically changing cartridges in either of said two orientations.

It is another object of the present invention to provide a new and improved magnetic tape cartridge changing machine wherein a group of cartridges are placed in any desired order in a removable magazine and means are provided responsive to placement of the magazine in said machine for automatically playing the cartridges in said magazine in said desired order and without removing any cartridge from said magazine.

It is a further object of the present invention to provide a new and improved magnetic tape cartridge changing machine wherein a group of cartridges are placed in any desired order in a removable magazine and said magazine can be inserted in said machine in either of two orientations and means are provided for automatically playing either one of two sets of sound tracks on the tapes in succession.

It is a still further object of the present invention to provide a new and improved magnetic tape changing machine wherein a group of cartridges are placed in any desired order in a removable magazine and means are provided for playing the tapes in said cartridges in one direction or the other depending upon the orientation of said magazine with respect to the machine.

Another object of the present invention resides in the provision of a new and improved magnetic tape cartridge changing machine wherein a plurality of tape cartridges are placed in any desired order in a removable magazine, the loaded magazine may be placed in the machine at either of two orientations, and means are provided for automatically playing the tapes in said cartridges in succession and in a direction depending upon the orientation of said magazine in said machine.

A further object of the present invention resides in the provision of a new and improved magnetic tape cartridge changing arrangement having a removable magazine within which a group of magnetic tape cartridges may be placed and wherein facilities are provided for positively preventing improper insertion of the cartridges into the magazine while permitting the tapes in said cartridges to be played in either of two directions.

A still further object of the present invention resides in the provision of a new and improved magazine for holding a plurality of magnetic tape cartridges.

It is another object of the present invention to provide a new and improved magazine for holding a plurality of magnetic tape cartridges which is adapted to be inserted into a magnetic tape changing machine in either of two orientations.

It is a further object of the present invention to provide a new and improved magnetic tape cartridge changing mechanism wherein the cartridges may be inserted into the mechanism in either of two orientations and means are provided for automatically playing the cartridges in one order when oriented one way and in the reverse order when oriented the other way.

It is a still further object of the present invention to provide a new and improved automatic changing mechanism for automatically playing a group of magnetic tape cartridges in rapid succession which is simple in construction, reliable in its operation and may be readily manufactured at low cost.

It is another object of the present invention to provide a new and improved magnetic tape cartridge changing mechanism which is capable of automatically changing a plurality of magnetic tape cartridges in a predetermined sequence and facilities are provided for manually altering said sequence.

It is a further object of the present invention to provide a new and improved magnetic tape cartridge playing mechanism which is capable of automatically playing a plurality of magnetic tape cartridges in a predetermined sequence and means are provided for manually selecting the tape to be played.

It is a still further object of the present invention to provide a new and magnetic tape cartridge playing mechanism which is capable of playing a plurality of magnetic tape cartridges automatically and wherein each tape is moved at a constantly increasing speed during the playing cycle, the diameter of the tape reel and the length of tape being correlated with the speed of the tape so that a change in the tape speed from beginning to end of the tape does not produce a change in the level of the high frequency components of the reproduced selection which is of sufficient magnitude to be detected by the average listener.

It is another object of the present invention to provide a new and improved magnetic tape cartridge including a pair of reels and a length of magnetic tape wound thereon which is arranged to be played by movement of the tape at a variable rate, the diameter of the tape reel and the length of tape being correlated with the speed of the tape so that the percentage change in tape speed from the beginning to the end of the recorded selection is in the order of 25 percent.

Briefly, in accordance with the present invention a removable or detachable magazine is provided which is adapted to receive a plurality of magnetic tape cartridges. Each magnetic tape cartridge is provided with two reels on which is wound a relatively short length of tape sufficient only to provide a playing time of from 3 to 5 minutes which is comparable to the playing time of a conventional disc record. The individual magnetic tape cartridges may be placed in the magazine in any desired order of succession and facilities are provided for insuring that the magnetic tape cartridges are placed in the magazine with the correct orientation to be played properly by the automatic tape player of the present invention. The reels contained in each cartridge are each provided with central apertures and each cartridge is provided with openings permitting access to these central apertures of the reels from either side of the cartridge. When the cartridges are positioned in the magazine the central apertures of each of the reels in the respective cartridges are positioned in alignment.

The automatic playing mechanism of the present invention is provided with a magazine receiving well into which a loaded magazine may be placed in either one of two orientations. When the magazine is placed in the well in one orientation a drive shaft is positioned within the central aperture of one group of reels of the cartridges positioned within the magazine and when the magazine is positioned with the reverse orientation, the drive shaft is positioned within the central apertures of the other reel in each cartridge.

In response to positioning of the magazine within the well, the automatic tape changing mechanism of the present invention is effective to wind the tape in a predetermined one of the cartridges onto the reel which surrounds the drive shaft without removing the tape from its individual cartridge. When the end of the tape is reached means are provided responsive to the increase in tension in the tape for automatically withdrawing the transducer head from the tape which has been played, producing relative movement between the drive shaft and the magazine to position another cartridge for engagement of the central reel aperture thereof by the drive shaft and then moving the transducer head into engagement with the new tape which is wound on the reel surrounding the drive shaft during the next playing cycle. This whole automatic changing cycle takes place within approximately one second and without rewinding the first tape on the other reel in the first cartridge. The magnetic tapes in the cartridges positioned within the magazine are thus played in rapid succession in the order in which they are positioned within the magazine. Facilities are also provided for manually changing from one magnetic tape cartridge to another at any time so that if the user does not wish to start or continue playing one cartridge he may manually reject this tape and instantaneously bring the next tape into playing position in a manner fully comparable to the manual reject action of a conventional disc record changer. The magazine is locked in its selected position within the well at all times during which the head is in contact with a tape of one of the cartridges so as to prevent inadvertent movement of the tape while the head is in engagement therewith. However, when all of the cartridges in the magazine have been played the transducer head is moved away from the last tape and is held in this position, the machine is automatically turned off and an indication is automatically provided signifying that the magazine may be bodily removed from the machine. It will thus be evident that the magnetic tapes in the plurality of cartridges positioned within the magazine are played in succession in the order in which the cartridges have been arranged in the magazine by the user so that the selections appearing on one sound channel of each cartridge are played in succession in said predetermined order.

When the selections on the other sound channel of the magnetic tapes are to be played, the magazine is inserted into the well with the opposite orientation so that the drive shaft is arranged to wind the tapes within the respective cartridges back onto the reels on which they were originally wound. The selections on the other sound channel of each of the cartridges are thus played in rapid succession but in the reverse order from that in which the first sound track selections were played since the magazine has been inverted. In this way an automatic changing mechanism is provided which is effective to play magnetic tape cartridges in rapid succession since no time is lost between playing cycles in rewinding the tape within the respective individual cartridges. Furthermore, since the transducer head need only be moved a short distance to permit selection of the next cartridge, an extremely fast automatic changing cycle is provided which is even quicker than the change time of a conventional disc record changer. This will be readily apparent when it is realized that the conventional disc record changer has to move the tone arm to a position beyond the record stack before the next record can be dropped which necessarily requires a considerably longer time than simply withdrawing a transducer head a fraction of an inch from the magnetic tape to permit the cartridge to be changed. Furthermore, in the arrangement of the present invention the elapsed time during which no selection is played is substantially less than with a conventional disc record changer due to the fact that the selection may start very close to one end of the tape and continue to a point very close to the other end of the tape. In disc records a lead-in groove and a runout groove are both required and traversal of these grooves takes a considerable length of time during which no selection is played.

The invention, both as to its organization and method of operation, together with further objects and advantages thereof, will best be understood by reference to the following description, taken in conjunction with the accompanying drawings, in which:

FIG. 10 is a sectional view taken along the lines 10—10 of FIG. 6;

FIG. 11 is a sectional view taken along lines 11—11 of FIG. 7; in

FIG. 11A is a fragmentary sectional view similar to FIGS. 10 and 11 but showing the parts in different position;

Figure 1:
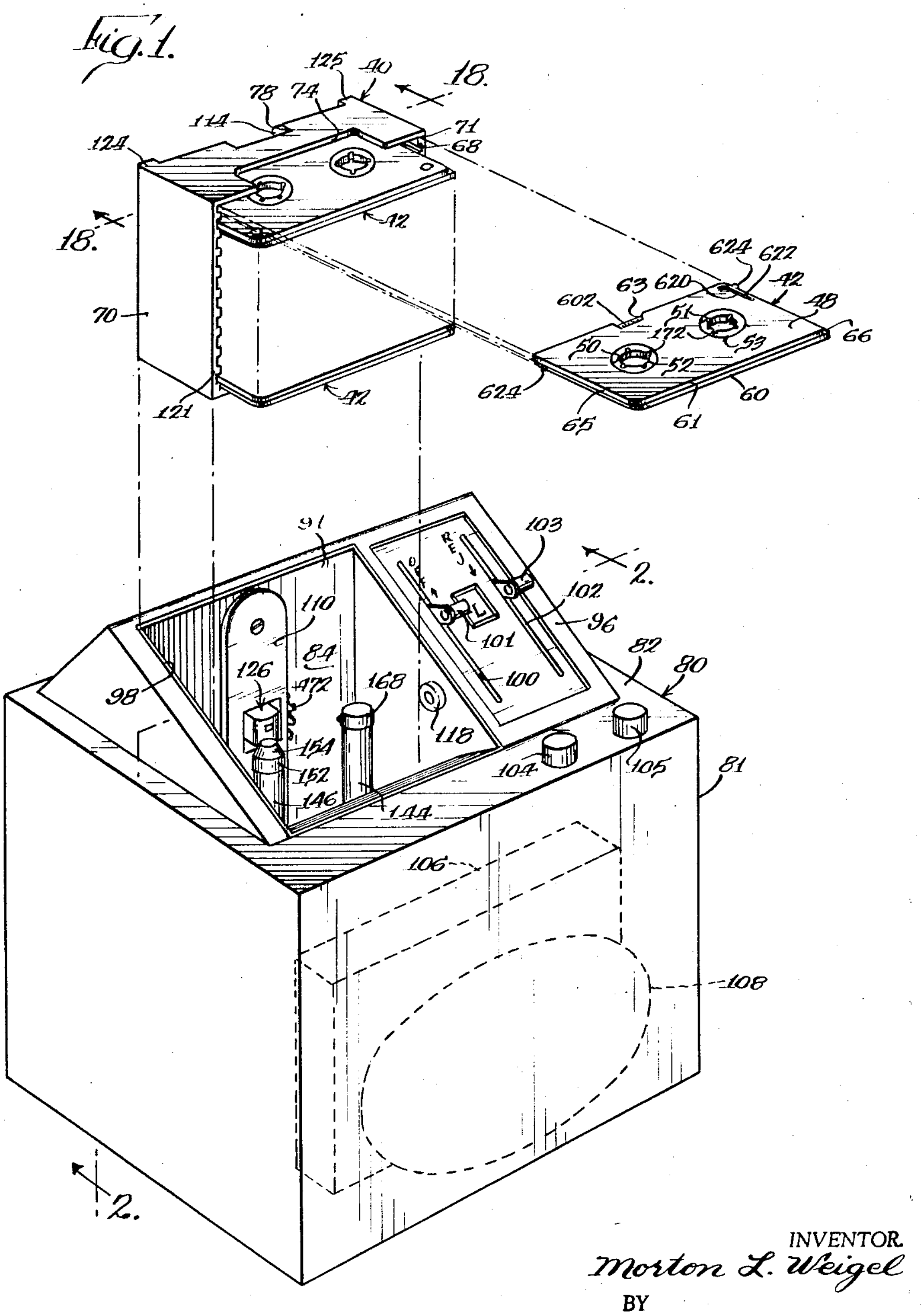
FIG. 1 is a perspective view of an automatic tape cartridge mechanism according to the present invention and illustrating the manner in which a magazine of tape cartridges can be inserted into the mechanism.

Referring now to the drawings, and more particularly to FIGS. 1 to 24, inclusive, the automatic tape cartridge changing mechanism of the present invention is therein illustrated as including a removable magazine indicated generally at 40 within which a group of ten magnetic tape cartridges, indicated generally at 42 may be selectively positioned in any desired order. Each of the cartridges 42 contains a pair of tape receiving flangeless reels 44 and 45 (FIG. 18) on which a length of magnetic tape 46 (FIG. 19) is wound. The top and bottom walls 48 and 49 of each cartridge 42 are provided with aligned apertures 50 and 51 therein which are adapted to receive enlarged hub portions 52 and 53 of the reels 44 and 45, respectively, so that these reels are loosely retained within the openings 50 and 51 of the cartridge 42. The hub portions 52 and 53 of the reels 44 and 45 are provided with central apertures 56 and 57, respectively, and when the cartridges are positioned within the magazine 40 the central apertures 56 and 57 of each cartridge are positioned in alignment with the corresponding central apertures of the other cartridges in the magazine.

Each of the cartridges 42 is comprised of two identical half sections 60 and 61 (FIG. 21) which are assembled together in a manner described in more detail hereinafter to provide the completed cartridge. Each of the sections 60 and 61 is provided with a notch 62, 63 in one side thereof which defines an opening through which the magnetic tape is accessible to a transducer head as it passes from one reel to the other within the cartridge. Also, the half sections 60 and 61 are so arranged that when assembled together they define sidewardly projecting offset shoulder portions 65 and 66 which are adapted to register with corresponding grooves 67 and 68 (FIG. 18) formed in the side walls 70 and 71 of the magazine 40. Accordingly, each of the cartridges 42 may be inserted in the magazine 40 in either one of two orientations but in both of these orientations the opening through which the magnetic tape within the cartridge is accessible is pointed to the rear of the magazine 40. Each of the magnetic tapes within the cartridges 42 is provided with two parallel sound channels, each of which may be monaural or stereo, on which individual selections are or may be recorded in opposite directions. Accordingly, either one of two selections may be selected by the user by choosing the proper orientation of a cartridge within the magazine 40.

In order to provide for automatic playing of the tapes within the cartridges 42 in rapid succession, the magazine 40 is provided with notch portions 74 in the top and bottom walls thereof which provide access to the central apertures of the reels of the aligned cartridges 42. Furthermore, the rear wall 76 of the magazine 40 is provided with a vertically extending opening or slot 78 which is generally in alignment with the notches 62, 63 of the cartridges 42 when they are assembled in the magazine so that the magnetic tapes in the respective cartridges are accessible from the rear of the magazine 40 through the slot 78.

Considering now the automatic tape changing mechanism proper, this mechanism, which is indicated generally at 80 in FIG. 1, comprises a generally boxlike cabinet 81 and a cover 82. The changer mechanism 80 is provided with means defining a magazine receiving well 84 within which the magazine 40 is adapted to be inserted with either one of two orientations, as will be described in more detail hereinafter. More particularly, the magazine receiving well 84 is in the illustrated embodiment defined by a cast member indicated generally at 86 (FIG. 2) which is provided with side walls 87, 88, a front wall 89 provided with an outwardly flared upper portion 90 (FIG. 8) and a rear wall 91, which collectively define the magazine receiving well 84. The cover 82 of the changer 80, which may be either of metal or plastic, is formed to provide a sloping top wall portion 96 and this sloping wall portion 96 is provided with a rectangular opening 98 which is adapted to receive the upper edge portions of the walls of the cast member 86. Preferably, the upper edges of the walls of the member 86 are provided with shoulders 99 (FIG. 2) which position the upper end of the member 86 within the opening 98 so that the upper edges thereof are flush with the top surface 96. The sloping top portion 96 of the cover 82 is also provided with a slot 100 through which an on-off lever 101 extends and a slot 102 through which a reject lever 103 extends.

The cover 82 may be secured to the cast member 86 in any suitable manner. The cover 82 is also provided with suitable openings for receiving the on-off volume control knob 104 and tone control knob 105 of the playback amplifier indicated generally at 106 which is positioned within the cabinet 81 and is provided with a loudspeaker 108 of any suitable design which is also contained within the cabinet 81. It will be understood that by removing the handle portions of the levers 101 and 103 and the knobs 104 and 105 the cover 82 may be removed for service or repair of the mechanism of the changer 80.

Figures 2, 2A:
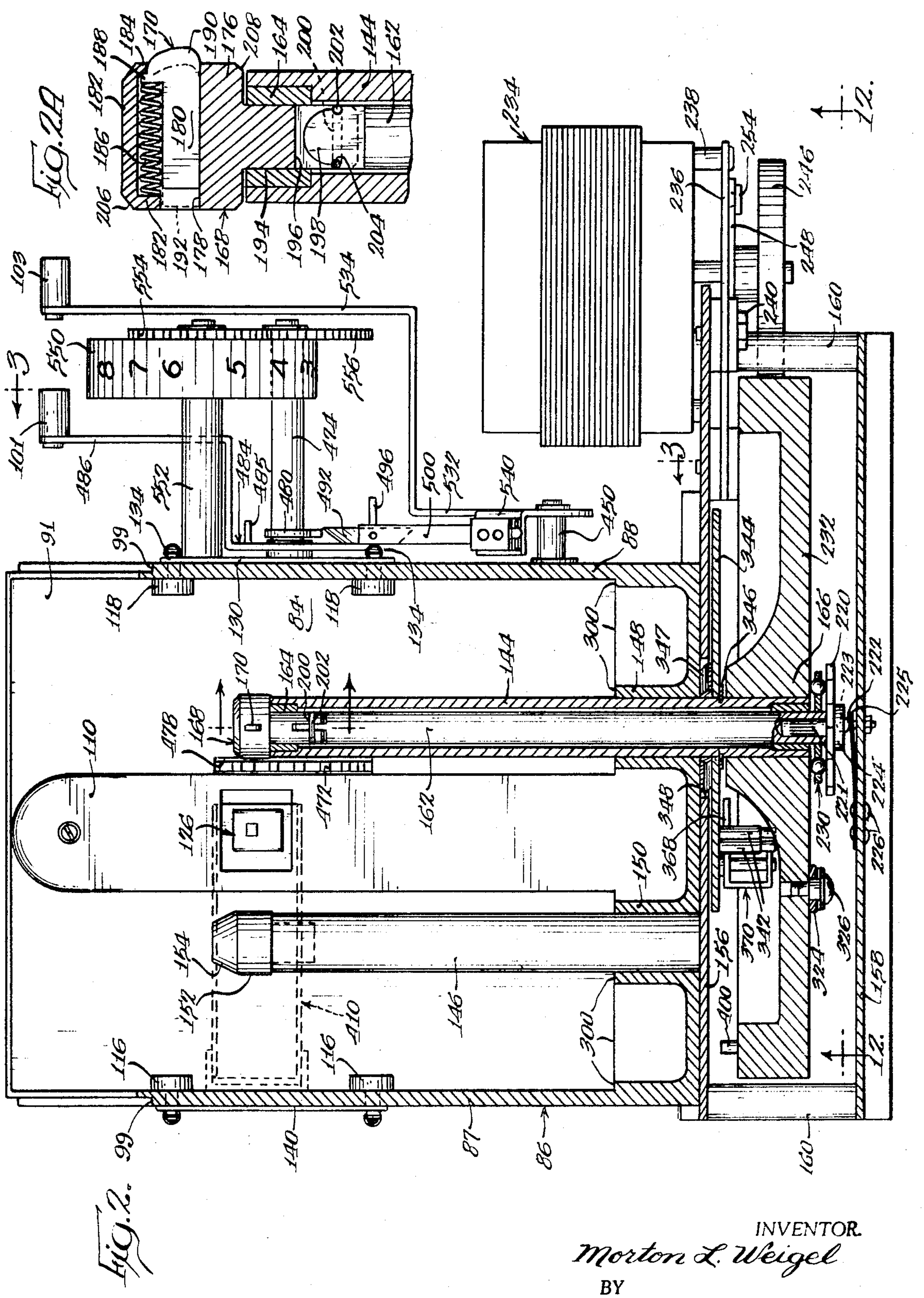
FIG. 2 is a sectional side elevational view taken along the lines 2—2 of FIG. 1.
FIG. 2A is a sectional view taken along the lines 2A—2A of FIG. 2.

In order to guide the magazine 40 so that it may be properly registered when inserted into the well 84, the rear wall 91 of the member 86 is provided with a vertically extending bevelled top guide shoulder indicated generally at 110 and the rear wall 76 of the magazine 40 is provided with a pair of vertically extending flanges 112 and 114 adjacent the edges of the slot 78 which are adapted to engage the sides of the shoulder 110 as the magazine 40 is inserted into the well 84. Also, two pair of spring biased rollers 116 and 118 are mounted in the side walls 87 and 88, respectively, of the casting 86 and bear upon the forward edges 120 and 121 of the magazine 40 as the magazine is inserted into the well, as best illustrated in FIG. 2. Accordingly, the magazine 40 is urged against the rear well 91 by the pairs of rollers 116 and 118 as the magazine 40 is inserted into the well. In addition to the vertically extending flanges 112 and 114, the magazine 40 is provided with vertically extending flanges 124 and 125 at the rear edges thereof which together with the flanges 112 and 114 function to space the cartridges 42 in the correct position for engagement of the magnetic tapes therein by a transducer head indicated generally at 126. Furthermore, the magazine is held in the correct position by the rollers 116 and 118 when the lowermost cartridge is being played.

Figures 3, 4, 5:
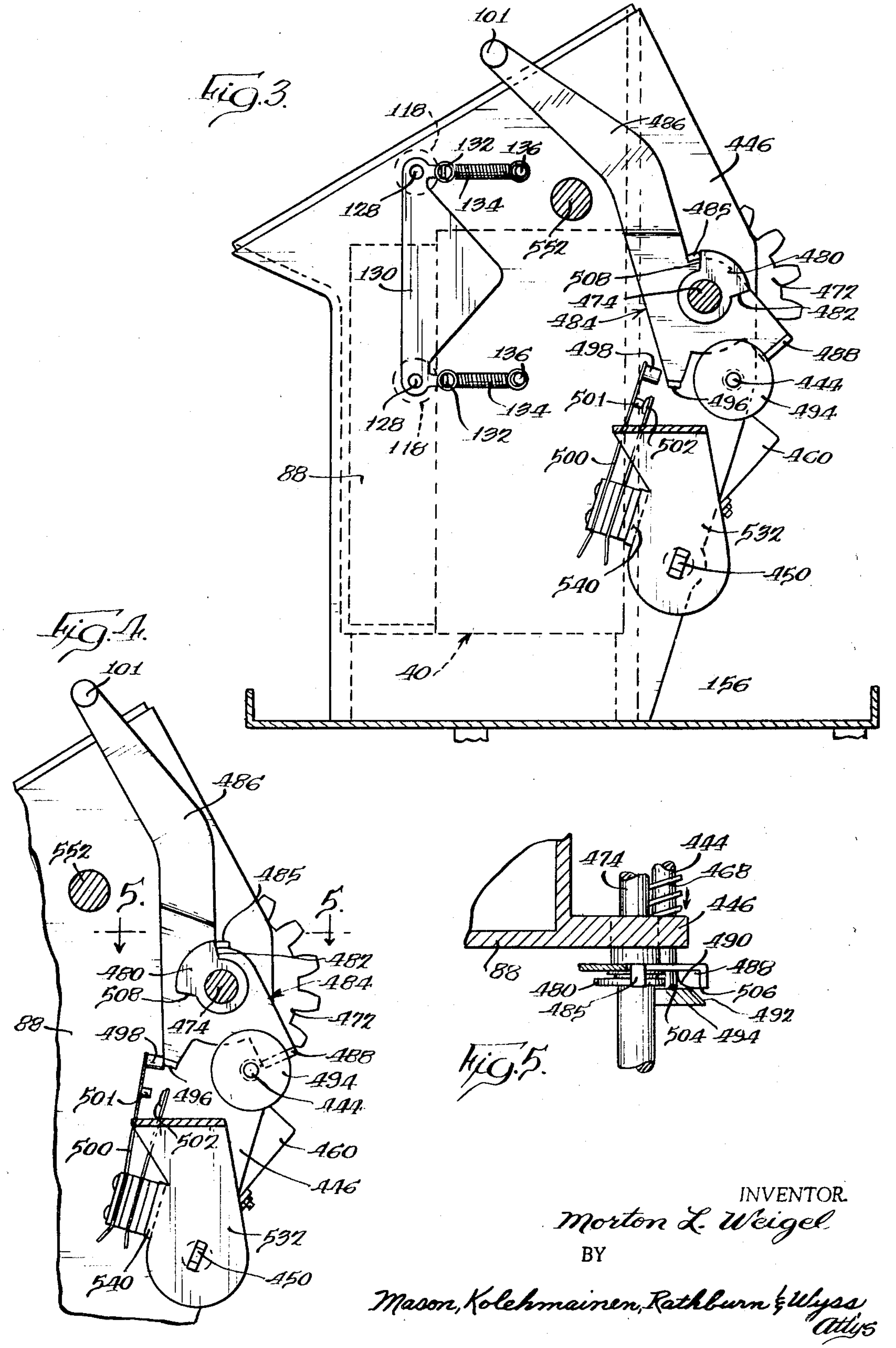
FIG. 3 is a sectional view taken along the lines 3—3 of FIG. 2.
FIG. 4 is a fragmentary view of a portion of the mechanism of FIG. 3 shown in the off position.
FIG. 5 is a fragmentary sectional view taken along the lines 5—5 of FIG. 4.

The rollers 118 are mounted on studs 128 which extend through horizontally elongated slots in the side wall 88 and are connected to the opposite ends of a triangularly shaped flat plate 130 (FIG. 3). The plate 130 is provided with a pair of out-turned lugs 132 which are connected through coil springs 134 to a pair of studs 136 secured to the wall 88. Accordingly, the rollers 118 are normally biased against the rear edge of the slots in the wall 88 by the springs 134 but may be moved forwardly against the force of these springs when the magazine 40 is inserted into the well 84. The rollers 116 are similarly spring biased by means of a plate 140 which is resiliently mounted on a wall 87 in a manner identical to the plate 130 described above.

In accordance with an important feature of the invention, the magnetic tapes within the individual cartridges 42 are arranged to be played in rapid succession by means engageable with the central apertures of the reels within these cartridges and without removing the tape from the cartridge during the playing or tape changing operations. More particularly, within the well 84 there is provided a pair of vertically extending guide sleeves 144 and 146 which are spaced apart by an amount corresponding to the separation of the reels 44 and 45 within the cartridges 42 and are secured to mounting sleeves 148 and 150 formed in the base of the casting 86. The guide sleeves 144 and 146 do not rotate and are of slightly smaller diameter than the central apertures 56 and 57 of the cartridge reels. However, the sleeve 146 is provided with a cap or head portion 152 which is of a diameter such that the central apertures 56, 57 of the cartridge reels will just slide smoothly thereover. The head portion 152 is provided with a conical top portion 154 which functions to center the loosely mounted cartridge reels as the magazine 40 is inserted into the well. The head portion 152 may be secured to the upper end of the guide sleeve 146 by any suitable means. The cast member 86 is mounted on a base assembly comprising a top base plate 156 to which the member 82 is secured and a bottom base plate 158 which is connected to the top base plate by means of the studs 160. The bottom end of the guide sleeve 146 is secured to the upper base plate 156 by any suitable means, the mounting sleeve 150 providing an elongated rigid support for the bottom end of the guide sleeve 146 so that this sleeve is accurately and securely mounted to the base assembly.

The guide sleeve 144 is also fixedly mounted in the sleeve portion 148 of the member 86 by any suitable means such as a set screw or the like. Also, the guide sleeve 144 is of somewhat smaller diameter than the central apertures 56, 57 of the cartridge reels. However, the sleeve 144 acts as a bearing support for a rotatable drive shaft 162 which is positioned within the guide sleeve 144. To this end, a bearing sleeve 164 is mounted in the upper end of the guide sleeve 144 and a bearing sleeve 166 is mounted on the bottom end of the guide sleeve 144, the drive shaft 162 riding on the sleeves 164 and 166.

Figure 8:
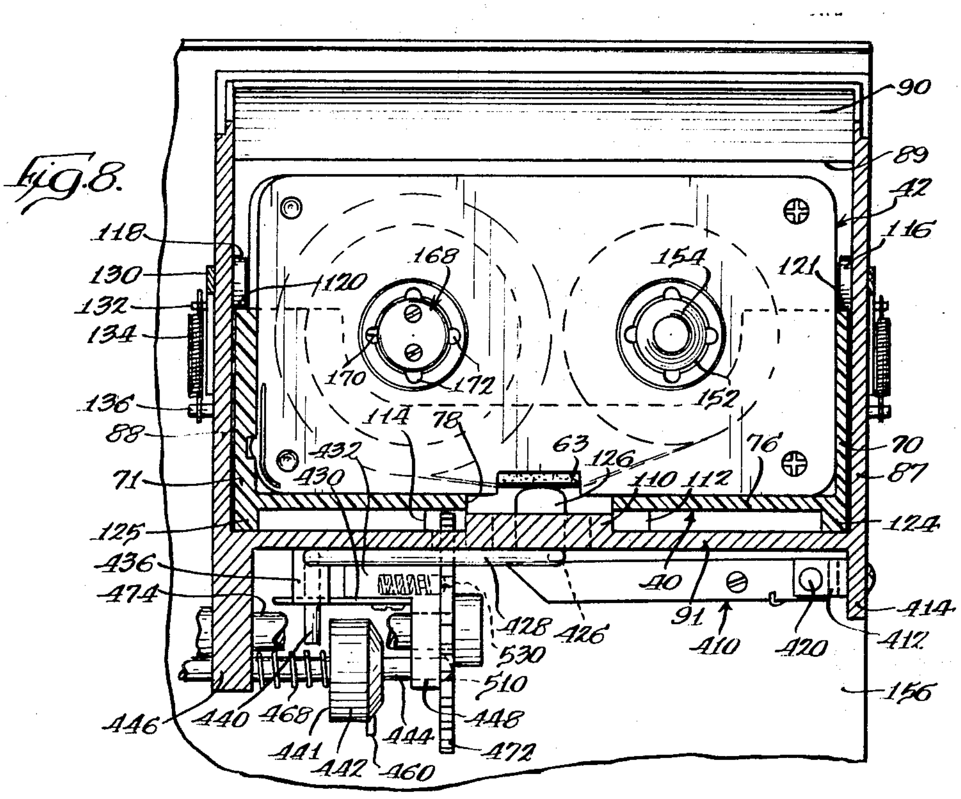
FIG. 8 is a sectional view taken along the lines 8—8 of FIG. 6.
Figure 9:
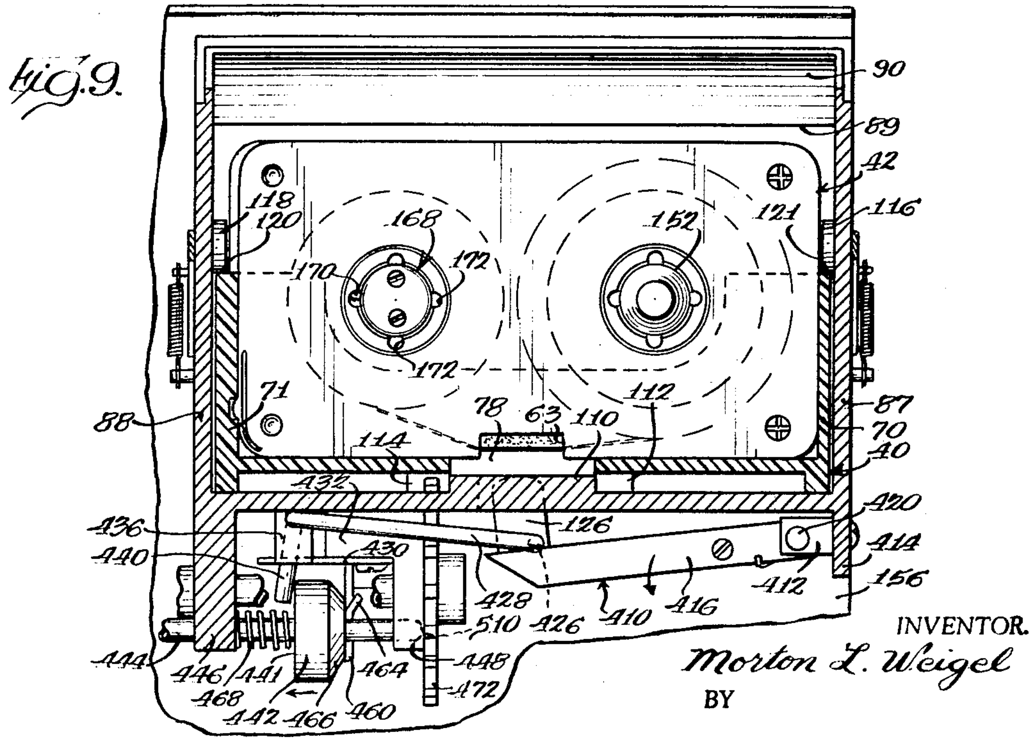
FIG. 9 is a sectional view taken along the lines 9—9 of FIG. 7.

In order to drive one reel of the selected cartridge while permitting movement of different cartridges into alignment with the transducer head 126, the drive shaft 162 is provided with a head portion indicated generally at 168 which has a diameter such as to produce a sliding fit with the central apertures 56, 57 of the cartridge reels and is also provided with a protruding spring biased lug 170. The hub portions 52, 53 of the cartridge reels are each provided with a plurality of vertically extending grooves 172 (FIG. 19) which communicate with the central apertures 56, 57 and provide interlocking means adapted to be engaged by the drive lug 170 when a particular cartridge is positioned with the head portion 168 in alignment with the reel hub of the cartridge. However, the drive lug 170 may be compressed until the tip thereof is contained within the diameter of the head portion 168 so that the magazine 40 may be inserted over the head portion 168 and selectively moved to position different cartridges in alignment with the head portion 168 without jamming the drive mechanism. The head portion 168 is of a thickness substantially equal to the thickness of one of the cartridges 42 so that when a cartridge is positioned with one of the reel hubs thereof in alignment with the head portion 168 only this reel of the selected cartridge is driven by engagement of the drive lug 170 with the edge of one of the grooves 172, as best illustrated in FIGS. 8 and 9 of the drawings.

Since the head portion 168 forms the driving means for transporting the magnetic tape within the selected cartridge past the transducer head 126, it is important that the head portion 168 be driven smoothly and without any wobble so that no wow is produced during the recording or playback operation. To this end, the head portion 168 is journaled in the upper bearing 164 and is connected to the drive shaft 162 by means of a universal joint arrangement. More particularly, the head portion 168 comprises a cylindrical upper portion 176 (FIG. 2A) which is provided with a vertically extending slot 178 therein which is adapted to receive the body portion 180 of the drive lug indicated generally at 170. A cap member 182 which may be secured to the body 176 by means of the screws 181 (FIG. 9) is provided with depending lug portions 183 and 184 which fit into the upper end of the slot 178 and a coil spring 186 is positioned between the lug 183 and an upstanding lug portion 188 formed in the drive lug 170. The spring 186 forces the lug 188 against the lug 184 so that the nose portion 190 of the drive lug is normally spring biased to an outer extreme position. However, if the nose portion 190 strikes the edge of the central aperture 56, 57 of one of the cartridge reels when the magazine 40 is placed in the machine, or when the magazine is moved within the well 84 to select different cartridges, the drive lug 170 may be cammed inwardly to the position shown in dotted lines at 192 in FIG. 2A so that the drive means does not become jammed as cartridges are changed.

The head portion 168 is provided with a bearing portion 194 of reduced diameter which rides in the upper bearing sleeve 164 and a vertically extending slot 196 is provided in the bottom end of the sleeve portion 194 which is adapted to receive a flat tongue portion 198 formed in the upper end of the drive shaft 162. The bottom end of the bearing sleeve portion 194 is provided with a groove 200 within which is positioned a snap ring 202 which engages suitable notches 204 in the opposite edges of the tongue portion 198 so that the head portion 168 is connected to the drive shaft 162 through the tongue and slot connection 196, 198. However, the head portion 168 is journaled for rotation in the bearing 164 and the above described tongue and groove connection provides a universal joint action which prevents uneven driving movement of the head portion 168.

In the event that it is desired to remove the head portion 168, for reasons to be described in more detail hereinafter, the head portion may be lifted upwardly with sufficient force to move the snap ring 202 out of the notches 204 in the tongue portion 198 and the head portion 168 may then be removed. However, it will be understood that the snap ring 202 connects the head portion 168 with the drive shaft 162 with sufficient force to prevent these parts from being separated as the magazine 40 is moved within the well 84 and the head portion 168 is forced to center successive reel hubs of different cartridges.

In order to facilitate the centering action of the head portion 168, the cover member 182 is provided with an upper mitered corner 206 and the bottom edge of the cylindrical portion 176 is provided with a mitered corner 208. Also, the reel hub portions 52 and 53 are provided with mitered corners 210 (FIG. 18) on both sides thereof adjacent the centering apertures 56, 57 to further facilitate the centering action of the head portion 168 and the stationary head portion 152 whereby the reels of the selected cartridge are accurately positioned for tape transport past the transducer head 126.

Considering now the manner in which the drive shaft 162 is rotated, a plate 220 is secured to the bottom end of the drive shaft 162 by any suitable means, such as the drive pin 221, and a single ball bearing 222 is positioned in a conical recess 223 of a mounting boss portion 224 on the plate 220. The ball 222 rests on a spring member 225 which is secured to the base member 158 by means of the rivets 226 and an adjustment screw 227 which is threaded through the base member 158 positions the underside of the flat spring 225 and may be locked in position by means of the nut 228. Accordingly, the bottom end of the drive shaft 162 is supported for rotation with minimum frictional drag by means of the single ball bearing 222 and the vertical position of the plate 220 may be adjusted by means of the screw 227. A ball bearing assembly indicated generally at 230 rides on the upper surface of the plate 220 and a fly wheel 232, which is rotatably mounted on the bottom end of the guide sleeve 144 rests on the ball bearing assembly 230.

An electrical motor indicated generally at 234 is mounted on a sub-base plate 236 by means of the studs 238 and the plate 236 is in turn mounted to the base plate 156 by means of the mounting screws 240. The motor drive shaft 242 extends through a clearance opening 244 in the plate 236 and engages a rubber tired idler wheel 246 which is rotatably mounted on a plate 248. The plate 248 is provided with elongated slots 250 and 252 which cooperate with large headed studs 254 and 256, respectively, to provide for limited pivotal movement of the plate 248 so that the idler wheel 246 is urged into engagement with the rim of the turntable 232 and the motor drive shaft 242 by means of a spring 258 connected from a lug on one end of the plate 248 to an upturned mounting lug 262 secured under the head of the screw 240. The flywheel 232 is thus driven from the motor drive shaft 242 at all periods during which this motor is energized.

Figure 12:
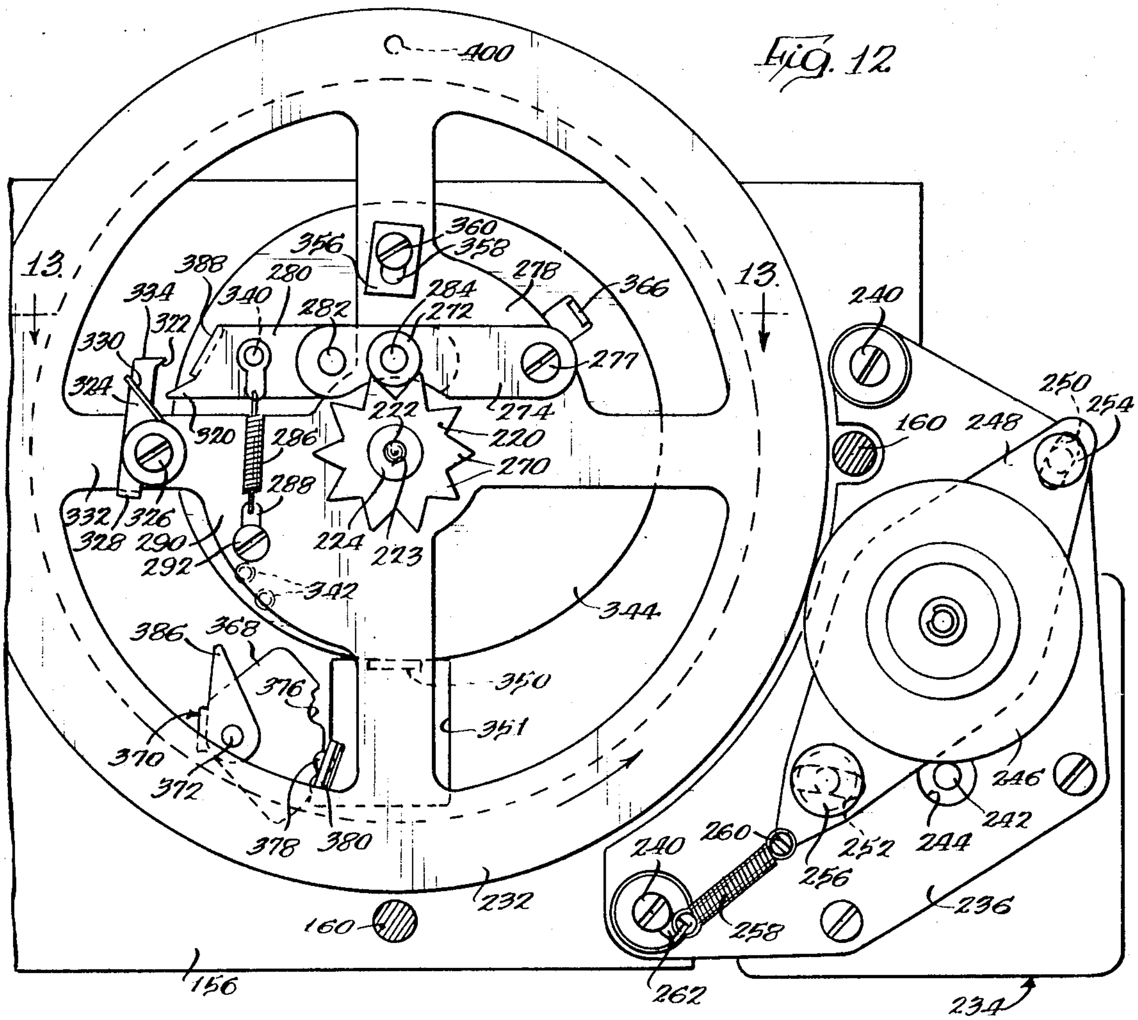
FIG. 12 is a sectional view taken along the lines 12—12 of FIG. 2.

In accordance with a further important feature of the invention, the drive shaft 162 is arranged to be driven directly from the flywheel 232 by means of a spring biased linkage which is capable of being disconnected in response to an increased load on the drive shaft 162 when the end of the magnetic tape which is being played is reached, as will be described in more detail hereinafter. More particularly, the plate 220 is provided with peripheral notches which define a series of triangularly shaped teeth 270 (FIG. 12) and a spring biased linkage which includes a roller 272 is mounted on the flywheel 232 in such manner that the roller 272 is normally seated between two of the teeth 270 as shown in FIG. 12. To this end, a flat spring member 274 is pivotally mounted by means of a screw 277 on a stud 276 secured to the central portion 278 of the flywheel 232 and a rigid flat bar 280 is connected to the flat spring 274 by means of the rivets 282 and a stud 284. The roller 272 is rotatably mounted on the stud 284 and the member 280 is connected by means of a spring 286 to a mounting lug 288 which is connected to an opposed central portion 290 of the flywheel 232 by means of the mounting screw 292. The spring 286 normally urges the roller 272 into engagement with the plate 220 so that the drive shaft 162, and hence the head portion 168 is driven in direct ratio with the flywheel 232.

Considering now the operation of the automatic tape changing mechanism described thus far, it will be understood that when the magazine 40 is loaded with magnetic tape cartridges arranged in the order in which these cartridges are to be played, it is inserted into the well 84. The vertically extending flanges 112 and 114 on the rear of the magazine 40 engage the sides of the shoulder 110 on the rear wall 91 of the casting 86 and the rollers 116 and 118 engage the forward edges of the magazine to hold the same against the rear wall 91 as the magazine is inserted into the well. As the magazine is inserted the conical upper portion 154 of the head portion 152 engages the central aperture of the left hand reel of the lowermost cartridge in the magazine. As the magazine is inserted further into the well the head portions 152 and 168 are successively pushed through the central apertures of the reels in each of the cartridges positioned within the magazine until the bottom surface of the magazine 40 rests upon a supporting surface defined by shoulders 300 (FIG. 2) formed in the casting 86. When the magazine is resting on the shoulders 300 the head portion 152 is positioned within the central aperture 56 of the uppermost cartridge in the magazine 40 and the head portion 168 is positioned within the central aperture 57 of the right-hand reel of this uppermost cartridge. Since the reels within the cartridges 42 may occupy any random position at the time the magazine 40 is inserted in the well 84, the right-hand reels of these cartridges may not be positioned correctly for the drive lug 170 on the head portion 168 to engage one of the notches 172. In such case the drive lug 170 is compressed into the head portion 168 as this head portion is moved through the right-hand reels of the successive cartridges within the magazine 40. However, when the magazine 40 is at rest in its bottommost position with the head portion 168 positioned within the central aperture 57 of the right-hand reel of the uppermost cartridge, the lug 170 will spring outwardly into the first one of the notches 172 which is encountered as soon as the drive shaft 162 commences to rotate, as will be described in more detail hereinafter. Accordingly, the magnetic tape in the uppermost cartridge is wound onto the right-hand reel 45 of the uppermost cartridge during the first playing cycle of the automatic changing mechanism.

Considering now the manner in which an automatic changing cycle is initiated after the magnetic tape in the uppermost cartridge has been played, the ends of the magnetic tape within each of the cartridges 42 are secured to the respective reels 44 and 45 by means of a positive connection to be described in more detail hereinafter. Accordingly, when the end of the first tape is reached, an increased load is placed on the drive shaft 162 since the end of the tape is restricted by connection to the opposite reel which is rotatably mounted on the head portion 152. Accordingly, the drive shaft 162 is abruptly halted when the end of the tape is reached while the flywheel 232 continues to rotate. Since the flywheel continues to rotate and its weight rests on the plate 220 sufficient rotational force could easily be exerted on the plate 220 by the rotating flywheel to break the tape when the anchored end thereof is reached. However, in accordance with an important feature of the invention, the bearing assembly 230 permits the flywheel 232 to be supported on the plate 220 without producing a substantial frictional drag on this plate. Accordingly, when the end of the tape is reached only a slight force is needed to restrain the plate 220 in spite of the continuously rotating flywheel 232.

When the drive shaft 162 is thus abruptly halted the roller 272 cams the lever 280 abruptly outwardly as the roller is moved to the tip of the adjacent tooth 270 since the plate 220, which is connected to the drive shaft 162, is likewise restrained when the end of the tape is reached. The free end of the lever 280 is provided with an extending finger portion 320 which normally occupies the position shown in FIG. 12 during periods when the drive shaft 162 and flywheel 232 are rotating together and the roller 272 is seated between the teeth 270. However, as the roller 272 rides up to the tip of the adjacent tooth 270, the lever 280 is cammed outwardly and an extending finger portion 320 thereof is moved outwardly. As the portion 320 is moved outwardly it strikes an inclined surface 322 on the end of a latching member 324 which is pivotally mounted on the flywheel 232 by means of a screw 326.

The latching member 324 is provided with a down-turned lug portion 328 and a spring 330, which is secured under the head of the screw 326 provides a slight spring bias which urges the lug 328 against the side of the adjacent spoke 332 of the flywheel 232 so that the latching member 324 is normally held in the position shown in FIG. 12. However, when the finger portion 320 engages the cam surface 322 on the member 324 this member is pivoted about the post 326 so as to permit the finger portion 320 to be moved beyond the flat end surface 334 of the member 324. As soon as the finger portion 320 is moved beyond the end 334 of the member 324 this member is returned to its initial position by the spring 330 so that the finger portion 320 rests against the end 334 of the member 324 and is held in such position that the roller 272 does not engage the teeth 270. The drive shaft 162 is thus disconnected from the flywheel 232 and remains disconnected for the remainder of the automatic change cycle. Preferably, the pivoted connection of the spring member 274 to the stud 276 is adjustable so that the correct latching action can be achieved.

Movement of the tripping lever 280 to its latched position (FIG. 14) in engagement with the end 334 of the latching member 324 is employed to initiate the automatic tape changing cycle. More particularly, when the trip lever 280 is moved to the latched position shown in FIG. 14 an upstanding post 340 (FIG. 13) which is secured to the trip lever 280 engages one of a pair of depending pins 342 secured to the underside of a cam plate 344. The cam plate 344 is rotatably mounted on the guide sleeve 144 below the base plate 156 by means of a C-washer 346 and a spring washer 347 is positioned in an opening 348 in the base member 156 between the bottom edge of the casting 86 and the cam plate 344 so that this cam plate is held against the C-washer 346. A spring load is thus placed on the cam plate 344 so that it will not be moved out of position between cycles or overshoot its home position. The periphery of the cam plate 344 is eccentric with respect to the axis of the drive shaft 162 and the cam plate 344 is rotated one full revolution during an automatic tape changing cycle. A cam follower 350 extends through an opening 351 in the base member 156 and rides on the periphery of the cam plate 344. Accordingly, as the cam plate 344 is rotated during the tape changing cycle the follower 350 will be pivoted from the position shown in FIG. 10 to the position shown in FIG. 11 and then is returned to its initial position during the tape changing cycle. This movement of the cam follower 350 is employed to perform correlated movements of the transducer head 126 and the magazine 40 in a manner to be described in more detail hereinafter.

Figures 14, 15, 15A:
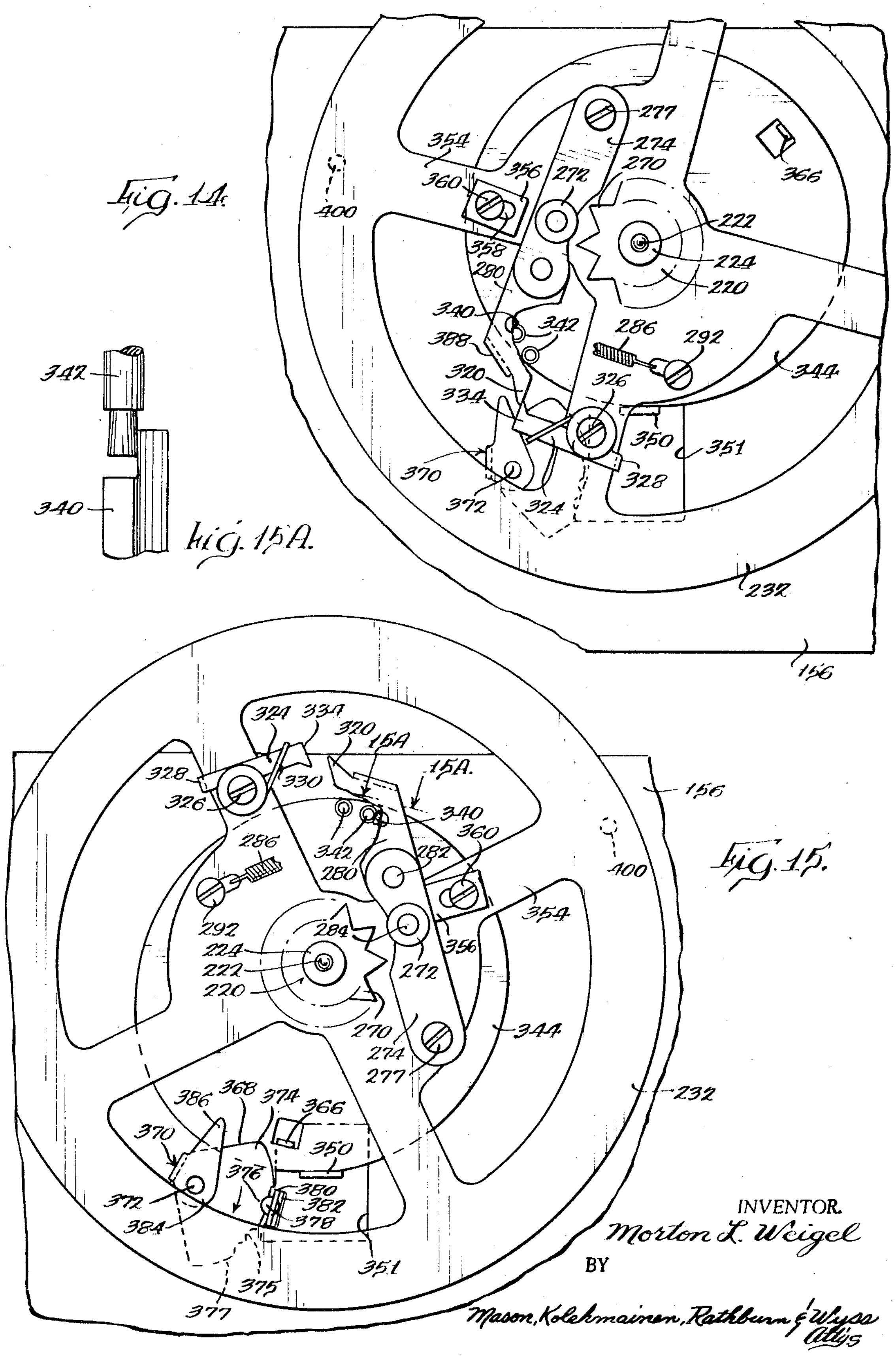
FIG. 14 is a fragmentary section view similar to FIG. 12 but showing the mechanism at an intermediate point in the automatic change cycle.
FIG. 15 is a fragmentary view similar to FIG. 14 but showing the parts at approximately the midpoint of the automatic change cycle.
FIG. 15A is a fragmentary sectional view taken along the lines 15A—15A of FIG. 15.

Considering further the action of the trip lever 280 during the automatic tape changing cycle, as soon as the post 340 engages one of the pins 342 the cam plate 344 is picked up and is thereafter moved with the flywheel 232. However, the loading of the automatic changing mechanism on the cam plate 344 is sufficient to move the trip lever 280 out away from the teeth 270 against the force of the spring 286 as the flywheel 232 continues to rotate. A positive stop is provided on the spoke portion 354 of the flywheel 232 by means of a flat bar 356 provided with an elongated slot 358 so that it may be clamped in an adjustable position on the spoke 354 by means of the screw 360. The trip lever 280 is thus moved outwardly under load until the edge of this lever engages the end of the bar 356, as shown in FIG. 15, at which time a positive drive connection is provided from the flywheel 232 through the trip lever 280 and the post 340 to the pin 342 on the cam plate 344. The cam plate 344 thus rotates with the flywheel 232 during the remainder of the automatic tape changing cycle. It will be noted that when the trip lever 280 is thus held against the stop 356 under load the end portion 320 thereof is moved away from the end 334 of the latching member 324. However, the latching member 324 remains in its latching position so that if the load of the changing mechanism is removed before the end of the changing cycle the spring 286 will again bring the tip portion 320 into engagement with the end of the latch 324 and hold the drive shaft 162 disconnected.

Figure 13:
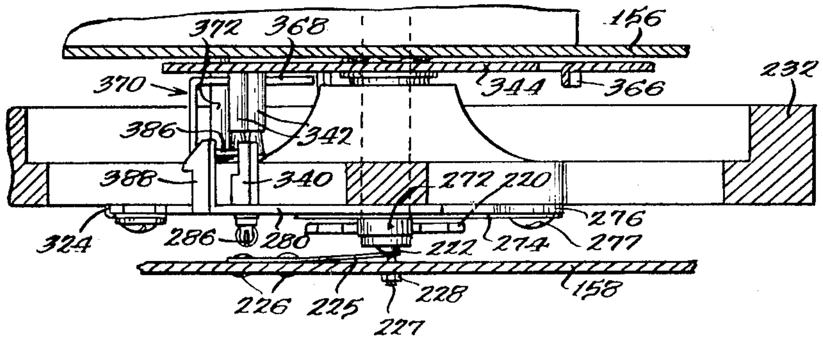
FIG. 13 is a sectional view taken along the lines 13—13 of FIG. 12.
Figure 16:
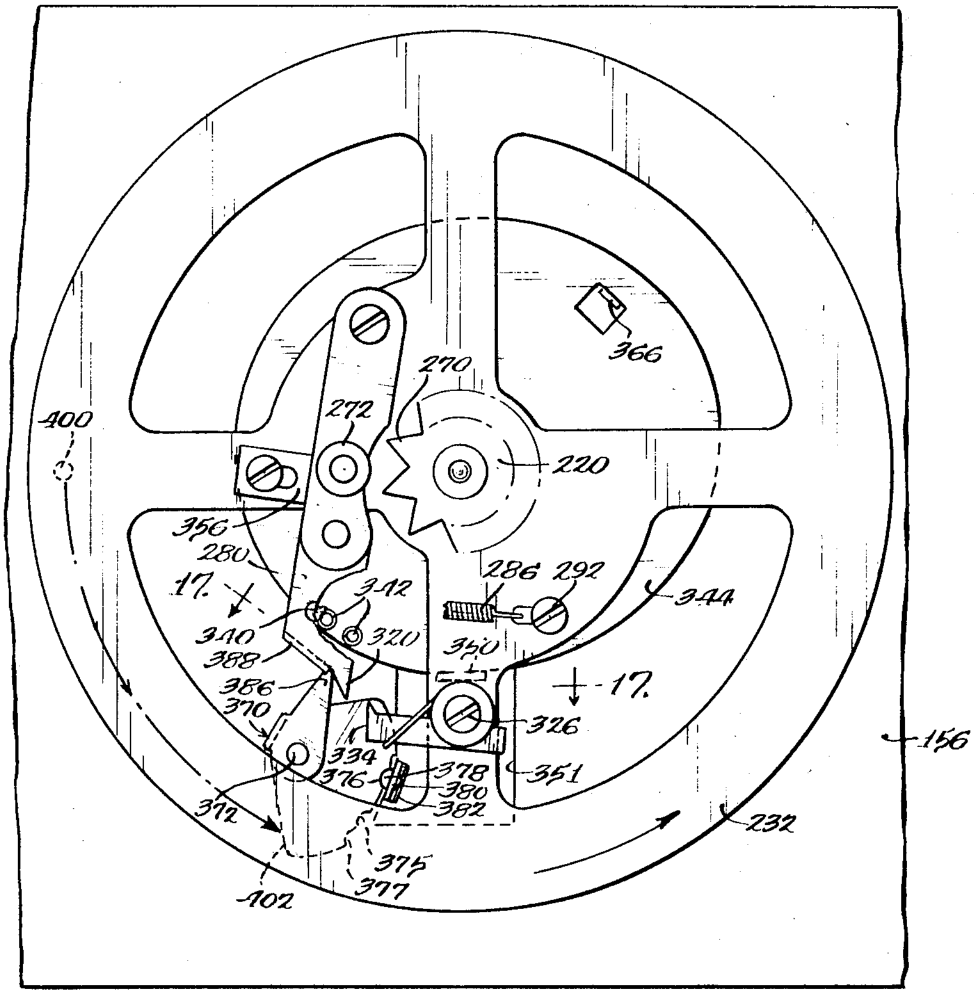
FIG. 16 is a fragmentary view similar to FIG. 12 but showing the parts at substantially the end of the change cycle.

The rest position of the cam plate 344 as shown in FIG. 12 and FIG. 14 illustrates an initial point in the automatic tape changing cycle wherein the post 340 has just engaged one of the pins 342. As stated above, the post 340 continues to engage one of the pins 342 for approximately one revolution of the flywheel 232 so that the cam plate 344 is given one full revolution during each automatic tape changing cycle. In order to terminate the tape changing cycle after approximately one full revolution of the cam plate 344, it is necessary to move the trip arm 280 past the latch member 324 and disengage the post 340 from the pin 342. This is accomplished by first positioning a reset lever in the path of the trip lever 280 so as to move it past the latch member 324 and thereafter moving the reset lever to an inactive position so that it will not interfere with the next tape changing cycle. More particularly, the cam plate 344 is provided with a downturned lug portion 366 (FIG. 13). Approximately midway in the automatic tape changing cycle the lug 366 engages an inclined shoulder portion 368 of a pivotally mounted U-shaped reset lever indicated generally at 370 (FIG. 16). The reset lever 370 is mounted for pivotal movement about a post 372 secured to the base plate 158 and is provided with a top plate portion 374 of arcuate configuration having a pair of notches 375 and 376 in the arcuate edge 377. The notches 375 and 376 are arranged to receive a steel ball 378 which is retained within an opening in a depending flange 380 formed in the base plate 158 by means of a spring arm 382 which is supported on the upper surface of the base member 158 by means of an L-shaped bracket 384. The ball 378 is thus spring biased into one of the notches 375 or 376 so as to provide a detent action to position the lever 370 in either one of two positions. The reset lever 370 normally occupies the position shown in FIG. 12 during a playing cycle, in which position the ball 378 is positioned in notch 375. However, as the lug 366 moves past the reset lever 370 it engages the inclined shoulder portion 368 thereof and moves this lever to the position shown in FIG. 15 wherein the ball 378 engages the notch 376, the lug 366 being shown in FIG. 15 at a point in the cycle just after it has moved the reset lever 370 to the reset position.

Figure 17:
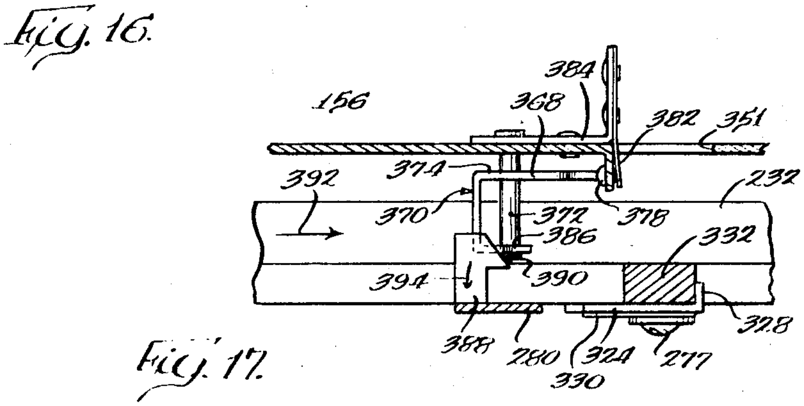
FIG. 17 is a sectional view taken along the lines 17—17 of FIG. 16.
Figure 18:
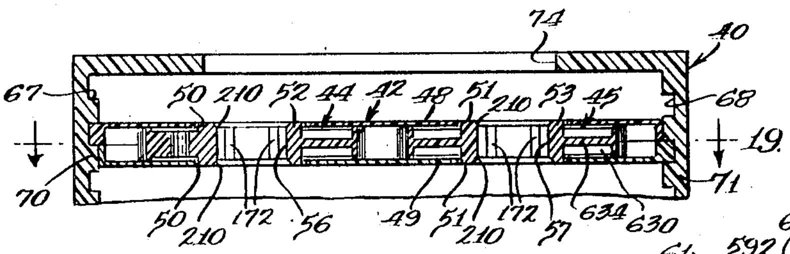
FIG. 18 is a sectional view taken along the lines 18—18 of FIG. 1.

The lower plate portion 384 of the U-shaped reset lever 370 is provided with a reset finger portion 386. When the reset lever 370 is in its inactive position shown in FIG. 12 the reset finger 386 is positioned outside the path of an upturned flange portion 388 on the trip lever 280 (FIG. 13). However, when the lever 370 is moved to the reset position shown in FIGS. 15, 16 and 17, it is positioned in the path of an inclined shoulder portion 390 of the upstanding flange 388 on the trip lever 280 (FIG. 17). In FIGS. 16 and 17 the parts are shown at substantially the end of the automatic tape playing cycle at the point where the inclined shoulder portion 390 has just started to engage the reset finger 386. As the flywheel 232 continues to move in the direction of the arrow 292 shown in FIG. 17 the trip lever 280 is cammed downwardly in the direction of the arrow 394 shown in FIG. 17. Movement of the trip lever 280 in this direction is permitted by the flat spring portion 274. As the lever 280 is thus moved downwardly the post 340 is moved below the bottom end of the pin 342 so that the cam plate 344 is disengaged and remains in its rest position until the next automatic tape changing cycle. Also, as the trip lever 280 is moved downwardly by the above described camming action of the finger 386, the latching finger 320 is moved past the end of the latching member 324 and the spring 286 pulls the trip lever 280 towards the axis of rotation of the flywheel 232 until the roller 272 is again seated between two of the teeth 270 on the plate 220. When this occurs the drive shaft 162 is again connected to the flywheel 232 so that the drive shaft is effective to wind the tape of the next cartridge during the next tape playing cycle. Preferably, the engaging surfaces of the post 340 and pin 342 are undercut so that these members have a positive driving engagement until they are disengaged by the above described movement of the trip lever 280, as shown in FIG. 15A.

Since the reset lever 370 has been moved to the reset position at approximately the midpoint of the tape changing cycle as described heretofore, it is necessary to reposition this lever to its inactive position shown in FIG. 12 so that it will not interfere with the next tape changing cycle. This is accomplished by means of an upstanding pin 400 provided on the upper surface of the rim of the flywheel 232. When the reset lever shown in FIG. 12 is held in its inactive position shown in FIG. 12 by the detent action of the ball 378, the pin 400 just clears the inclined edge portion 402 of the bottom plate 374 of the reset lever 370. However, when the reset lever has been cammed to the reset position shown in FIGS. 15, 16 and 17, the shoulder 402 of this lever is positioned in the path of the pin 400. The pin 400 is positioned along the rim of the flywheel 232 so that it will engage the shoulder 402 and cam the reset lever 370 back to its inactive position after the reset finger 386 has moved the trip arm 280 in the manner described above to disengage the cam plate 344 and reestablish a driving connection to the drive shaft 162. It will be seen from FIG. 16 that the pin 400 engages the reset lever 370 and moves it back to the inactive position somewhat less than one-quarter of a revolution of the flywheel 232 after movement of the cam plate 344 is terminated. Upon resetting of the lever 370 to its inactive position the tape changing cycle is completed and another playing cycle is initiated.

Figure 6:
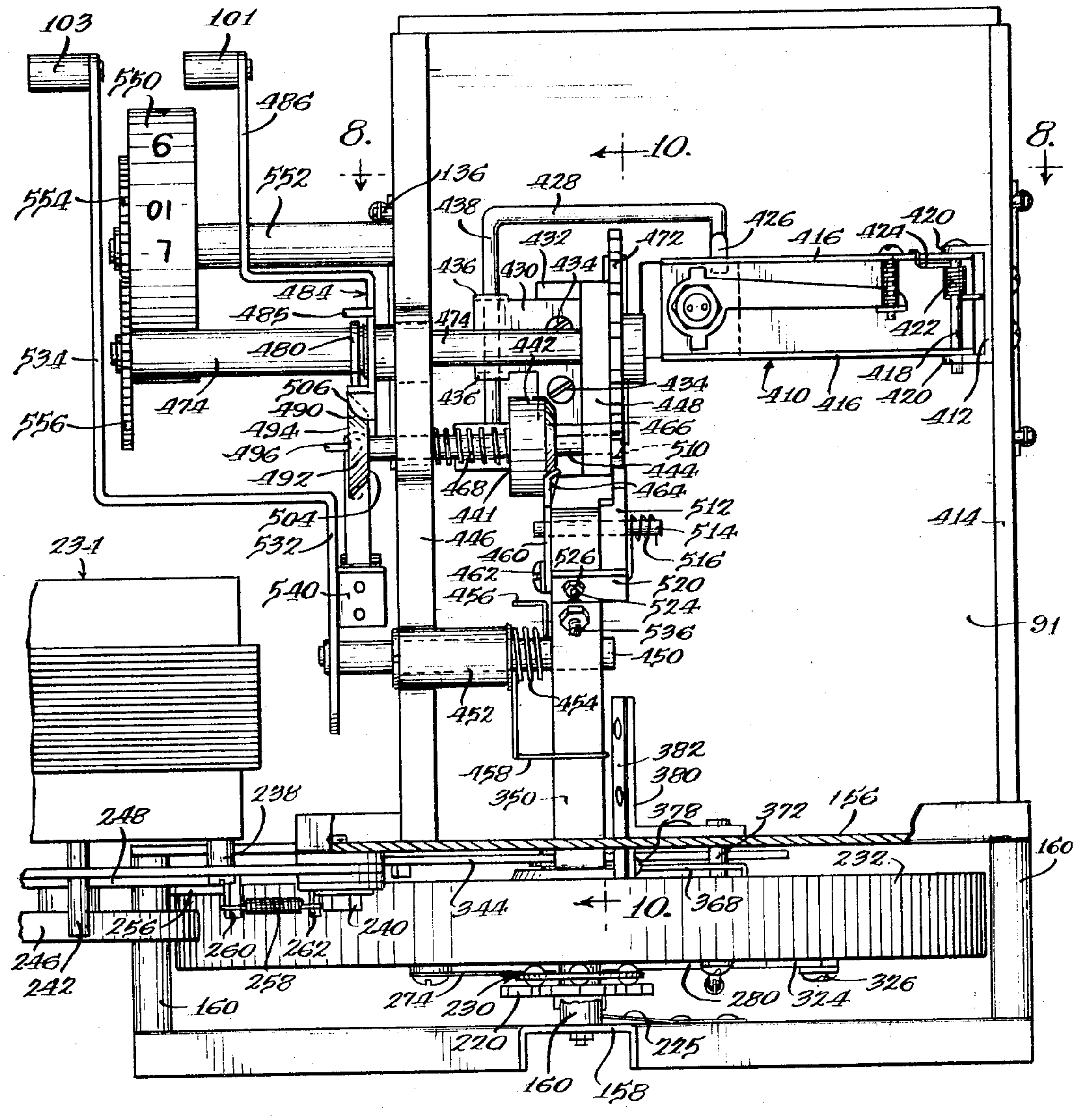
FIG. 6 is a rear view of the mechanism of FIG. 2.
Figure 7:
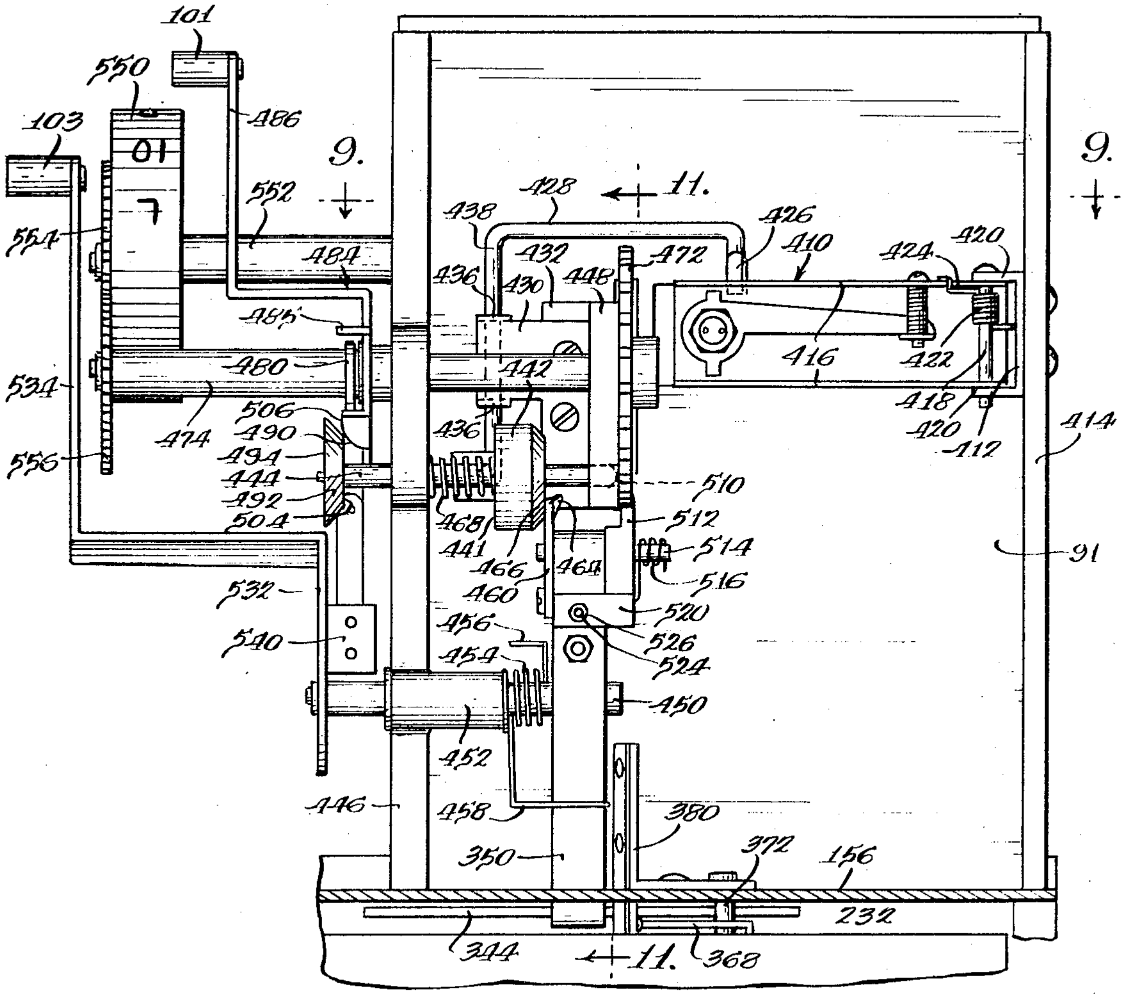
FIG. 7 is a fragmentary rear view similar to FIG. 6 but showing the mechanism in a change cycle position.

Considering now the manner in which the above described rotation of the cam plate 344 is employed to control movement of the transducer head and magazine during the automatic tape changing cycle, during this change cycle it is necessary to withdraw the transducer head 126 from the tape which has just been played and in timed relation move the magazine 40 upwardly within the well 84 by an amount sufficient to position the head portions 152 and 168 within the reel apertures of the next cartridge and then reposition the transducer head in engagement with the tape of this cartridge. More particularly, the transducer head 126 is mounted on the free end of a bracket 410 which bracket is pivotally secured to a U-shaped mounting bracket 412 which is attached to vertically extending flange portion 414 formed in the casting 86 as an extension of the side wall 87 thereof. To this end the bracket 410 is provided with top and bottom flanges 416 and a mounting pin 418 extends through the upstanding gears 420 of the bracket 412 and the flanges 416 of the bracket 410 to provide for pivotal movement of the bracket 410 about a vertical axis. A coil spring 422 positioned about the post 418 is provided with an end portion 424 which engages the top one of the flanges 416 and urges the bracket 410 against the flattened end portion 426 of a generally U-shaped control rod 428. The control rod 428 is mounted for pivotal movement about a vertical axis by means of a bracket 430 which is secured to a mounting boss 432 formed in the rear wall 91 of the casting 86 by means of the screws 434, the bracket 430 being provided with horizontally extending ear portions 436 (FIG. 7) which act as spaced bearings for the vertically extending longer arm portion 438 of the rod 428. The bottom end of the rod portion 438 is provided with a right angle end portion 440 the side of which is adopted to engage one end face of a cylindrical hub member 442 which is secured to a transversely slidable shaft 444. The shaft 444 is journaled in a vertically extending rear flange portion 446 of the casting 86 and in a rearwardly extending flange portion 448 of the mounting boss 432. The cam follower 350 is connected to the end of a shaft 450 which is journaled in a mounting boss 452 formed in the rear wall 91 of the casting 86 and a coil spring 454 is positioned about the shaft 450 intermediate the cam follower 350 and the boss 452. One end 456 of the spring 454 engages the rear wall 91 and the other end 458 thereof extends over the cam follower 350 below the shaft 450 so as to bias the cam follower continuously into engagement with the periphery of the cam plate 344 (FIG. 6).

In order to actuate the shaft 444 transversely in response to pivotal movement of the cam follower 350 during the tape changing cycle, a bracket 460 is secured to the upper end of the cam follower 350 by means of the screw 462 and is provided with a flared upper corner 464 which is adapted to engage a sloping cam surface 466 formed in the edge of the hub 442. When the bottom end of the cam follower 350 is moved outwardly from the position shown in FIG. 10 to the position shown in FIG. 11 during the tape changing cycle, the corner flange 464 engages the camming surface 466 and exerts a sidewise pressure on the shaft 444 which is sufficient to move this shaft transversely against the force of a coil spring 468 positioned around the shaft 444 between the flange 446 and the end face of the hub 442. As this occurs the end face 441 of the hub 442 engages the offset end portion 440 and pivots the control rod 428 from the position shown in FIG. 8 to the position shown in FIG. 9 so that the bracket 410 is pivoted outwardly and the transducer head 126 is moved out of engagement with the magnetic tape in the last played cartridge. When the cam follower 350 is returned to its initial or rest position during the last half of the tape changing cycle the bracket 460 is moved away from the hub 442 so as to permit the spring 468 to move the shaft 444 transversely to its rest position shown in FIGS. 6 and 8. As this occurs the hub 442 is moved away from the end portion 440 of the control rod 428. However, the spring 422 exerts a bias in the bracket 410 which is effective to pivot the bracket 410 inwardly until the transducer head 126 engages the tape in the cartridge which has been positioned during this tape changing cycle. The control rod 428 is carried back to the rest position shown in FIG. 8 by this pivotal movement of the bracket 410 since the end portion 426 of the control rod 428 engages the outer end of the bracket 410. However, when the control rod 428 is flat against the rear wall 91 a slight clearance is provided between the end portion 426 and the bracket 410 so that the transducer head 126 is free to be urged against the magnetic tape by the spring 422.

Considering now the manner in which the magazine 40 is moved upwardly within the well 84 during an automatic tape changing cycle, the vertical flanges 112 and 114 provided on the rear of the magazine 40 adjacent the opening 78 therein are each provided with a series of rack teeth 470 (FIG. 10) extending from top to bottom of the magazine 40. A magazine positioning gear 472 is connected to a shaft 474 which is journaled in the vertically extending flange 446 of the casting 86 and in the flange portion 448 of the mounting boss 432 at the rear of the casting 86. The gear 472 is provided with a series of teeth 476 which are appropriately shaped to mesh with the rack teeth 470 on the magazine 40, and the gear 472 is so positioned that the edge of this gear extends through a narrow vertical slot 478 in the rear wall 91 of the casting 86 adjacent the edge of the guide flange 110 provided on the inner surface of the wall 91. Accordingly, when the magazine 40 is inserted into the well 84 the rack teeth 470 engage the teeth 476 of the gear 472 as the magazine is inserted and rotate the gear 472 as the magazine is moved to a position in which the bottom surface thereof is seated on the surfaces 300 of the casting 86. In this connection it is pointed out that each of the flanges 112 and 114 on the magazine 40 is provided with the rack teeth 470 so that irrespective of the orientation of the magazine 40 as it is inserted in the well 84, one set of rack teeth engages the gear 472.

When the magazine 40 is initially inserted into the well the electric motor 234 is deenergized and the transducer head 126 is withdrawn out of the path of the magnetic tapes in the cartridges positioned within the magazine so that the exposed portions of these tapes are not caught by the transducer head 126 as the magazine is moved to the bottom of the well. More particularly, an automatic shutoff cam plate 480 (FIG. 3) is secured to the shaft 474 on the outboard side of the mounting flange 446 so that the cam plate 480 rotates with the shaft 474. When the machine is turned off the cam plate 480 occupies the position shown in FIG. 4 wherein the edge 482 thereof engages a turned out lug 485 provided on an on-off lever indicated generally at 484 which is pivotally mounted on the shaft 474. The lever 484 is provided with an offset arm portion 486 which extends through the slots 100 in the cover portion 96 and is provided with a handle portion 101 which is accessible from the exterior of the machine. The on-off lever 484 is also provided with an end flange 488 which has a cam surface 490 (FIG. 6) which is adapted to engage a sloping cam surface 492 on a camming hub 494 which is secured to the end of the shaft 444 outboard of the flange 446. When the on-off lever 484 is moved to the off position shown in FIG. 4 by engagement of the edge 482 of the cam plate 480 with the lug 485, the cam surface 490 cams the hub 494 to the left as viewed in FIG. 6 so that the shaft 444 is moved transversely and the face 441 of the hub 442, also connected to this shaft, engages the control rod end 440 and pivots the control rod 428 so that the transducer head 126 is held away from the magnetic tapes in the cartridges positioned within the magazine 40. The on-off lever 484 is also provided with an out-turned lug portion 496 which is adapted to engage a stud 498 of insulating material positioned on the end of a flexible switch arm 500 so that the switch contacts 501 and 502 are held out of engagement and the motor 234 is deenergized, it being understood that the switch contacts 501 and 502 control the supply of voltage to the motor 234 in a conventional manner.

The on-off lever 44 is moved to the position shown in FIG. 4 during the last or automatic shutoff change cycle when the gear 472 is actuated during this last change cycle in the manner described in more detail hereinafter. However, the lever 484 is held in the position shown in FIG. 4 by the pressure exerted by the spring 468 which urges the face 504 of the cam hub 494 against the side 506 (FIG. 6) of the flange 488 on the shutoff lever 484. When the magazine 40 is inserted into the well 84 and the rack teeth 470 engage the teeth 476 of the gear 472 this gear is rotated in a counterclockwise direction (as viewed in FIG. 4) so that the cam plate 480 is rotated from the position shown in FIG. 4 to the position shown in FIG. 3. As the cam plate 480 moves to the position shown in FIG. 3 the edge portion 508 thereof engages the lug 485 on the on-off lever 484 and moves this lever from the position shown in FIG. 4 to the position shown in FIG. 3. This movement of the lever 484 moves the lug 496 out of engagement with the studs 498 and permits the switch contacts 501 and 502 to close so that the motor 234 is energized. At the same time the flange 488 is moved away from the shaft 444 so as to permit this shaft to be moved transversely to the right, as viewed in FIG. 6. The bracket 410 is thereby permitted to move inwardly under the force of the spring 422 so that the transducer head 126 is moved into engagement with the magnetic tape in the uppermost cartridge positioned in the magazine 40.

In order to lock the magazine 40 in each playing position thereof so that the magazine cannot be physically removed while the transducer head 126 is in contact with a magnetic tape in one of the cartridges, the end of the shaft 444 which is journaled in the flange 448 is provided with a rounded head portion 510 which is adapted to enter the space between any two of the teeth 476 on the gear 472. The shaft 444 is shown in the locking position thereof in FIG. 6 wherein the rounded end portion 510 of this shaft is positioned between two of the gear teeth 476 so as to provide a positive lock which prevents the magazine 40 from being physically removed from the well 84.

Considering now the manner in which rotation of the cam plate 344 is employed to shift the magazine 40 upwardly within the well 84 during the automatic tape changing cycle so that the next lower cartridge in the magazine will be moved into alignment with the transducer head 126, the cam follower 350 is provided with a gear actuating ratchet 512 which is pivotally mounted on a post 514 secured to the upper end of the cam follower 350. A coil spring 516 is positioned on the post 514, one end of the spring 516 being secured to this post and the other end 518 thereof being connected to the ratched 512. The spring 516 biases the ratchet 512 so that an offset flange portion 520 thereof is normally held in engagement with the surface 522 of the cam follower 350. As the cam plate 344 is rotated during the tape changing cycle the ratchet 512 engages one of the teeth 476 on the gear 472 and moves this gear counterclockwise as viewed in FIGS. 10 and 11. This rotation of the gear 472 produces upward movement of the magazine 40 within the well 84 in an amount sufficient to position the next lower cartridge in the magazine in alignment with the transducer head 126.

If the magazine 40 were moved upwardly while the transducer head 126 is in engagement with a magnetic tape in one of the cartridges, damage to the tape would result. Also, the locking end portion 510 of the shaft 444 must be removed from between the teeth of the gear 472 before this gear can be rotated. Accordingly, the flange portion 464 on the bracket 460 is arranged to contact the cam surface 466 on the hub 442 and move the shaft 444 transversely to the left, as viewed in FIG. 6, before the ratchet 512 engages one of the gear teeth 476. Thus, the initial movement of the cam follower 350 at the beginning of the tape changing cycle is employed to shift the shaft 444 laterally to remove the head portion 510 thereof from locking engagement with the gear 472 and at the same time the hub 442 engages the end 440 of the control rod 428 and pivots this rod so that the transducer head 126 is moved away from the magnetic tape which has just been played.

Figures 10, 11, 11B:
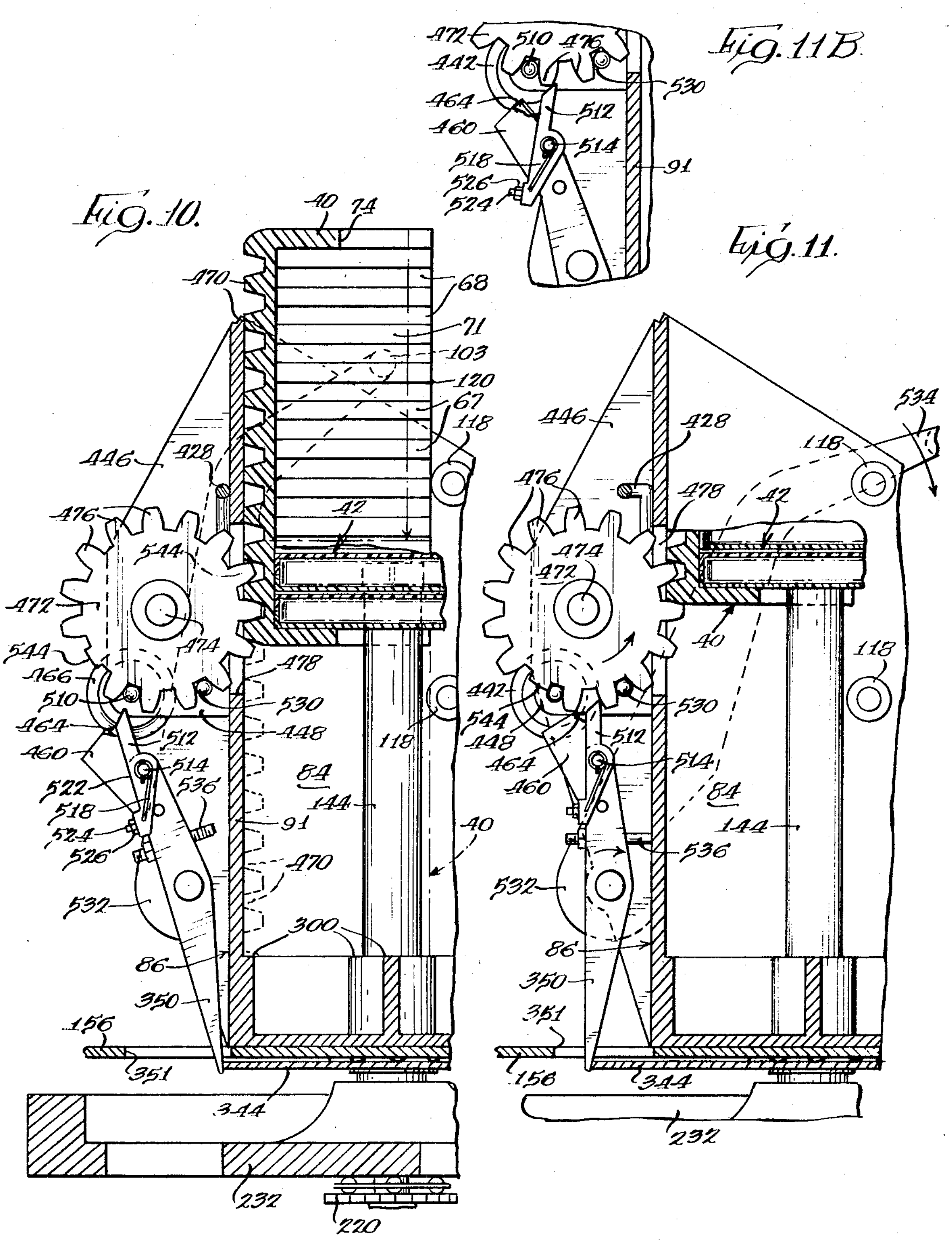

As the bottom end of the cam follower 350 continues to be moved outwardly during the tape changing cycle the ratchet 512 rotates the gear 472 one step to position the next lower cartridge in alignment with the transducer head 126. During the last half of the tape changing cycle the cam follower 350 is moved back to its rest position shown in FIG. 10. During this movement of the cam follower 350 the ratchet 512 pivots about the post 514 against the force of the spring 516, as illustrated in FIG. 11A, until the tip of the ratchet 512 clears the next tooth on the gear 472 at which time the spring 516 moves the ratchet 512 back to its rest position with the flange 520 thereof in engagement with the cam follower 350. A pawl and ratchet action is thus provided by the pivotally mounted ratchet 512.

While the end portion 510 of the shaft 444 functions to prevent the magazine 40 from being removed, the end portion 510 must necessarily be spaced from the edges of the teeth 476 to prevent jamming as the end 510 is inserted. As a result, the end portion 510 does not function as a locating or indexing means for the magazine 40. Also, during most of the tape changing cycle the shaft 444 is moved out of locking engagement with the gear 472 and it is necessary to provide some restraint for the gear 472 to prevent the magazine 40 from falling of its own weight, particularly during the return stroke of the cam follower 350. To locate the magazine 40 accurately and hold it during the tape changing cycle, a spring biased ball 530 is positioned in a recess in the mounting boss 432 and is arranged to be biased outwardly against the side of the gear 472 so that this ball 430 will partially enter the space between adjacent teeth 476 on this gear. The ball 530 thus acts as a spring biased detent to hold the gear 472 in any one of the 10 playing positions of the magazine 40 so that this magazine is accurately positioned for engagement with the transducer head 126 with any one of the cartridges and the magazine is held in this position during periods when the locking shaft 444 is withdrawn from between the teeth 476.

The position of the ratchet 512 with respect to the cam follower 350 may be adjusted by means of a set screw 524 and locking nut 526 provided in the flange 520 so that the transducer head 126 and magazine 40 are moved in correctly timed relation.

In accordance with a further important feature of the invention, the magazine 40 is automatically moved to an automatic shutoff or loading position after the last tape has been played. In this loading position the head 126 is removed from the last tape, the magazine 40 is unlocked for removal from the well 84 and the motor 234 is turned off. When the magazine 40 is in the position shown in FIG. 11 the head portion 168 is aligned with the bottom cartridge in the magazine so as to play the tape in this cartridge. After the last tape is played an automatic change cycle is initiated, as described heretofore, during which cycle the gear 472 is rotated one step from the position shown in FIG. 11 by engagement of the member 512 with the tooth 525 on the gear 472. When this occurs the magazine 40 is moved upwardly by an amount such that the bottom tooth **470*a* of the magazine rack teeth 470 rests on the top one of the gear teeth 476 which extends into the well 84. Accordingly, the magazine 40 is no longer restrained and can then be bodily removed from the well. As the gear 472 is rotated during this automatic shutoff cycle the edge 482 of the cam plate 480 (FIG. 4) engages the lug 485 and moves the on-off lever 484 to the shutoff or loading position shown in FIG. 4. As this occurs, the flange 488 engages the hub 494 and cams the shaft 444 to the left, as viewed in FIG. 6, and holds this shaft in the position shown in FIG. 5 in which position the rounded end portion 510 of the shaft 444 is withdrawn by an amount sufficient to clear the gear 472 so that this gear is no longer locked. However, the ball detent 530 is still effective to hold the magazine 40 in the loading position within the well 84. At the same time, lateral movement of the shaft 444 is effective to withdraw the transducer head 126, as described in detail heretofore, and the shaft 444 is restrained in the lateral offset position by engagement of the flange 488 with the cam hub 494 so that the transducer head 126 is continuously held in the withdrawn position shown in FIG. 9. When the on-off lever 484 is moved to the off condition shown in FIG. 4 the switch contacts 501, 502 are also opened to deenergize the motor 234**.

After the magazine 40 has been removed from the well 84 is may be inverted and repositioned in the well, so as to play the other selection on each tape, or in the alternative different cartridges may be positioned in the magazine. In this connection it will be noted that it is also possible to invert the magazine and also replace some cartridges by new ones having preferred selections thereon. The only requirement is that the individual cartridges should be positioned within the magazine so that the tape is ready to be wound on the right hand reel (as viewed in FIG. 18) by the head portion 168. Furthermore, even if the tape in one or more cartridges is already wound on the right hand reel before the magazine is inserted into the well, the machine will immediately sense a fully wound reel due to tension on the drive head 168 and will initiate a tape changing cycle immediately so that the next cartridge is brought into alignment with the drive head 168 and the transducer head 126.

When the magazine 40 is reinserted into the well the bottom tooth **470*a* rests on the uppermost tooth of the gear 472 and a slight downward pressure on the magazine 40 is sufficient to overcome the force of the detent 530 so that the magazine 40 may be readily pushed to the bottom of the well where is rests on the shoulder 300. As the magazine 40 is moved downwardly the teeth 470 engage and rotate the gear 472 and the cam plate 480 (FIG. 4) is also rotated in a counterclockwise direction as viewed in FIG. 4. As the magazine 40 nears the bottom of the well, the edge 508 of the cam plate 480 engages the opposite edge of the lug 485 and moves the on-off lever 486 to the on position shown in FIG. 3. This moves the flange 488 out of engagement with the hub 494 and permits the shaft 444 to be moved to the right as viewed in FIG. 9 so that the transducer head 126 is moved into engagement with the tape in the uppermost cartridge in the magazine and the gear 472 is locked against rotation to prevent withdrawal of the magazine. Movement of the lever 486 to the on position also closes the contacts 501, 502 so that the motor 234 is energized and tape is moved past the head 126. In this connection it will be understood that the lever 532 may also carry contacts for controlling energization of the amplifier 106**, as will be readily understood by those skilled in the art.

In order to provide for manual rejection of a particular cartridge at any time during a playing cycle and to provide for manual selection of any particular cartridge within the magazine 40, there is provided a reject lever 532 which is connected to the same shaft 450 to which the cam follower 350 is secured. The reject lever 532 is provided with an offset portion 534 which extends through the slot 102 in the cover portion 96 so that this lever can be manually actuated. When the handle portion 103 connected to the lever 532 is moved downwardly the cam follower 350 is pivoted away from the edge of the cam plate 344 against the bias of the spring 454. This movement of the reject lever 532 can cause pivotal movement of the cam follower 350 until an adjustment screw 536 strikes the wall 91 of the casting member 86.

It will thus be evident that the cam follower can be actuated manually by movement of the reject lever 532 to perform the same functions which movement of the cam follower accomplishes when this follower is actuated by engagement with the edge of the cam plate 344. Thus, as the handle 103 is moved downwardly and the cam follower 350 is pivoted, the flange portion 464 of the plate 460 engages the hub 442 and cams the shaft 444 to the left, as viewed in FIG. 6, so that the locking end portion 510 of this shaft is moved beyond the edge of the gear 472, the control rod 428 is actuated so as to remove the transducer head 126 from engagement with the tape being played and the gear 472 is rotated one step by engagement of the ratchet 512 with one of the teeth 476.

The handle 103 can be moved downwardly only to the point at which the adjustment screw 536 strikes the wall 91, this position corresponding to the outermost position of the cam follower 350 when it is actuated by the cam plate 344. When the reject handle 103 is released, the spring 454 moves the cam follower 350 back into engagement with the edge of the cam plate 344 and at the same time the reject lever 532 is returned to its inactive position shown in FIG. 1. It will thus be evident that any one of the magnetic tape cartridges may be rejected at any time during the playing cycle by actuation of the handle 103 so that the flexibility of operation in selecting different cartridges is fully comparable to the conventional disc record changer. Furthermore, the above described manual change from one cartridge to another can be made within a fraction of a second by actuation of the handle 103 so that any one of the cartridges within the magazine 40 may be readily selected in the event that these cartridges have not been placed in the required order when they were inserted into the magazine.

In certain instances it may be desired to remove the magazine 40 from the well 84 before all of the cartridges within the magazine have been played. In accordance with a further important aspect of the invention, the above described manual reject feature may be employed to actuate the magazine rapidly to the above described automatic shut off or loading position within the well 84. For example, if the fifth cartridge in the magazine is being played and it is desired to remove the magazine from the well 84, the manual reject handle 103 is actuated rapidly several times and each actuation of this handle is effective to rotate the gear 472 one step. As the gear 472 is rotated the edge 482 of the cam plate 480 engages the lug 485 and moves the on-off lever 486 to the shutoff or loading position shown in FIG. 4. When the lever 486 is thus moved to the shutoff position, the magazine is positioned to be removed from the well, and the motor 234 is deenergized in the same manner as described heretofore in connection with the action of the mechanism during the automatic shutoff cycle. In this connection, it will be noted that the switch contacts 501 and 502 are mounted on a right angle flange 540 on the manual reject lever 532 so that these switch contacts are bodily moved with the lever 532 during each manual actuation. Accordingly, the motor 234 is not deenergized until the lever 486 is moved to the off position shown in FIG. 4 in which position the lug 496 functions to separate the contacts 501 and 502 as the reject lever 532 is returned to its normal position by the spring 454 (FIG. 6).

In order to prevent the gear 472 from being actuated, either manually or during an automatic tape changing cycle, to a position wherein the magazine 40 will be moved upwardly beyond the above described loading position, the gear 472 is provided with a mutilated tooth 544 which is cut off so that the tip of the ratchet 512 does not engage the tooth 544 and hence is ineffective to actuate the gear 472 beyond the automatic shutoff or loading position of this gear. Accordingly, when the magazine 40 has been moved to its uppermost position in the well 84 further actuations of the handle 103 will not produce further upward movement of the magazine 40 within the well.

In order to provide an indication of the position of the magazine 40 within the well 84, there is provided an indicator dial 550 (FIG. 6) which is rotatably mounted on a stub shaft 552 secured to the side wall 88 of the casting member 86. A spur gear 554 is connected to the end face of the dial 550 and meshes with a spur gear 556 connected to the end of the outboard side of the shaft 474. The dial 550 is provided with numerals indicating the 10 alignment positions of the magazine 40 for playing the 10 tape cartridges positioned therein and is also provided with an indication of the loading position of the machine. As the magazine is moved upwardly in the well 84 during each tape changing cycle the dial 550 rotates to the next position and when the magazine 40 is moved to the loading position this position is also indicated on the dial 550. In a similar manner, when the magazine 40 is inserted into the well and the gear 472 is rotated as described heretofore, the dial 550 is moved in the reverse direction so that the numeral 1 is visible through a suitable aperture in the cover 96.

In the event that a number of cartridges less than 10 are to be played at a given time, the cartridges are arranged in the desired order in the grooves 67, 68 beginning at the bottom of the magazine 40. The magazine 40 is then positioned in the well with the bottom surface thereof resting on the shoulders 300. However, in this position the transducer head 126 will not engage a magnetic tape because the upper most position in the magazine is empty. The manual reject lever 103 is then actuated a number of times sufficient to raise the magazine to the position in which the transducer head 126 engages the top one of the group of cartridges in the magazine and the machine will thereafter play these cartridges automatically in succession and turn the machine off at the end of the last automatic tape changing cycle as described heretofore.

If, at any time, it is desired to turn the machine off and remove the magazine 40 from the well 84, the on-off handle 101 can be moved upwardly within the slot 100 as that the on-off lever 484 is moved from the position shown in FIG. 3 to the position shown in FIG. 4 manually. When this occurs, the flange 488 engages the cam hub 494 and cams the shaft 444 laterally so as to remove the locking head portion 510 from engagement with the gear 472. At the same time, the lug 496 on the lever 484 separates the contacts 501 and 502 so that the motor 234 is deenergized, it being understood that the reject lever 532 remains in its up position shown in FIG. 4 during this operation. Lateral shifting of the shaft 444 is effective to withdraw the transducer head 126 from the magnetic tape being played in the manner described in detail heretofore. Accordingly, the magazine may be removed from the well, irrespective of the position of this magazine in the well, by lifting the magazine upwardly. As this is done, the rack teeth 470 engage the teeth 476 of the gear 472 and rotate this gear back to the loading position so that the gear is properly indexed for insertion of the magazine the next time. The spring 468 provides a bias force which holds the end face 504 of the cam hub 494 against the end surface 506 of the flange 484 so that the off lever 101 remains held in the off position shown in FIG. 4. However, when the magazine 40 is reinserted into the well and is moved to its lowermost position in which it is seated on the shoulders 300 the edge 508 of the cam plate 480 engages the lug 485 and moves the on-off lever back to the position shown in FIG. 3, which, as described in detail heretofore, is effective to turn on the motor 234 and release the shaft 444 so that the transducer head 126 is moved into engagement with the tape positioned in the uppermost slot in the magazine 40.

Figure 19:
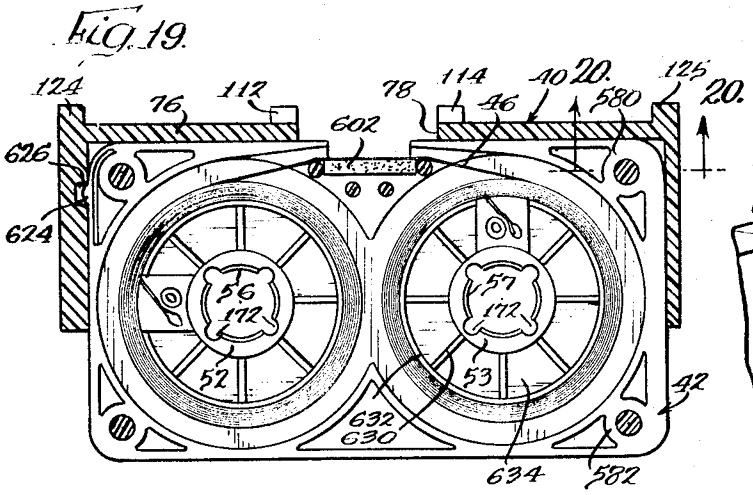
FIG. 19 is a sectional view taken along the lines 19—19 of FIG. 18.
Figure 20:
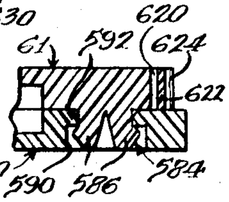
FIG. 20 is a fragmentary sectional view on an enlarged scale taken along the lines 20—20 of FIG. 19.
Figure 22:
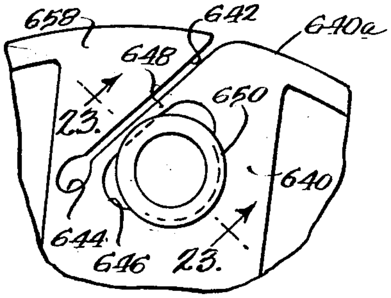
FIG. 22 is a fragmentary view of a portion of one of the reels of the tape cartridge of the present invention showing the manner in which the end of a length of tape is secured to the reel.
Figure 21:
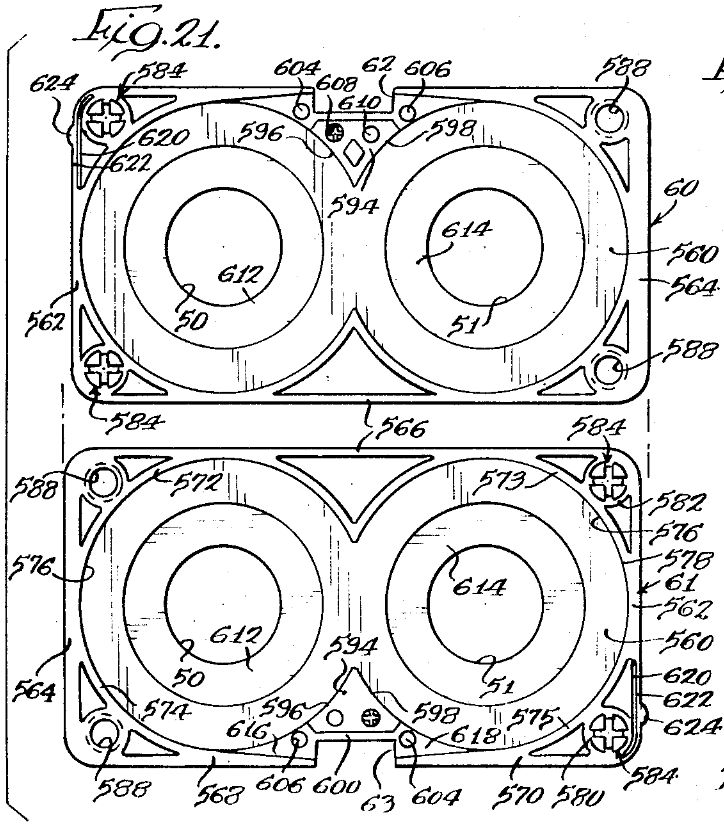
FIG. 21 is a plan view of the two halves of the tape cartridge of the present invention shown in aligned position before they are assembled.

Considering now in more detail the construction of the magnetic tape cartridges 42, and referring to FIGS. 18 to 21, inclusive, each of these cartridges is formed by a pair of identical half sections indicated generally at 60 and 61. Each of these sections includes a top or bottom wall portion 560. An upstanding narrow flange 562 forms one end rim of the sections 60, 61 and a wider flange 564 forms a rim at the other end of these sections. A further upstanding flange portion 566 forms a rim along the rear edge of the cartridge and a pair of flanges 568 and 570 form the front rim of the cartridge which is broken by the opening 63 therein. In addition to these rim flanges a plurality of arcuate flange portions 572, 573, 574 and 575 is provided adjacent each corner of the sections 60, 61 which cooperate with the side and end rims to provide circular flanged surfaces 576 and 578 which function to contain the tape wound on the reels 44, 45 when the sections 60 and 61 are assembled together. Each of the sections 60, 61 is provided with a pair of boss portions 580, 582 at the corners of one end thereof which provide a support for integrally formed blocking pins 584, which are provided with split end portions to define a plurality of deformable tongues 586 (FIG. 20). The tongues 586 are adapted to be inserted into apertures 588 formed in the other end of the sections 60, 61 when these sections are assembled together so as to provide a snap-in construction whereby all four corners of the section of 60, 61 may be held tightly together. As shown in FIG. 20, each of the apertures 588 is provided with an enlarged bore 590 which defines a locking flange 592 which is adapted to receive the tongues 586 so that the two half sections of the cartridge are held tightly together.

It will be noted that the axis of symmetry of the sections 60, 61, i.e., a line through the center of the apertures 62, 63 is not at the exact middle of the sections 60 and 61. Accordingly, when these sections are assembled, the wide end flanges 564 extend over the narrow end flanges 562 of the opposite section so as to provide the above described locking flanges 65, 66 (FIG. 1) which cooperate with the grooves 67, 68 provided in the side walls 70, 71 of the magazine 40.

In order to provide a resilient support for the magnetic tape within the cartridge against which the transducer head 126 may be pressed, and to provide a further extension of the circular surfaces 576 within the cartridge, there is provided on each of the sections 60, 61 a generally triangularly shaped boss 594 which provides a pair of arcuate surfaces 596 and 598 which are continuations of the surfaces 576, 578 and also provides an end surface 600 which when the sections 60, 61 are assembled together acts as a shoulder to receive a small piece of felt 602 (FIG. 19). Each of the sections 60, 61 is also provided with a guide post 604 adjacent one corner of the boss 594 and an aperture 606 adjacent the other corner of this boss. When the sections 60, 61 are assembled together each of the posts 604 of these sections is adapted to enter the hole 606 of the opposing section so that the completed cartridge is provided with two guide posts 604 over which the tape is transported as it is wound from one reel to the other. With this construction the guide posts 604 do not have any break or seam intermediate the length thereof, as then would have if half sections of each post were provided on each of the sections 60, 61, so that a smooth surface is provided over which the tape may be guided during transport past the transducer head.

In order to secure the central portions of the two half sections 60, 61 together so as to insure that a tight joint is provided adjacent the edge aperture 62 thereof, the boss 594 in each half section is provided with a split tongue post 608 and an aperture 610, the post 608 of one of these sections being adapted to enter the aperture 610 of the other section when the sections are assembled together so that the bosses 594 are held tightly together and the cartridges securely closed adjacent the aperture 62.

In order to permit the use of flangeless reels 44, 45 on which the magnetic tape may be wound, each of the wall portions 560 of the sections 60, 61 is provided with a pair of raised annular boss portions 612 and 614 adjacent the hub receiving apertures 50, 51 therein. Furthermore, there is provided raised boss portions 616 and 618 in the area of the pins 604 and openings 606. The diameter of the boss portions 612, 614 is somewhat less than the diameter of the flangeless reels 44, 45 so the tape which is sound on the periphery of these reels need not scrape against the top and bottom walls 560 of the sections 60, 61. The guide bosses 616, 618 function to center the tape laterally within the cartridge so that it passes by the transducer heat at a fixed location. Accordingly, the tape which is registered by the guide bosses 616, 618 is wound on the rim of the reels 44, 45 without scraping against the intervening portions of the walls 560 so that frictional drag on the edges of the tape is minimized. The felt backing strip 602 over which the tape is moved during the reeling operation, is preferably secured to the end walls of the triangular shaped boss 594 by means of a suitable pressure-sensitive adhesive provided on one side of the felt. It will also be noted that the felt strip 602 is seated between the opposed pins 604 when the sections 60, 61 are assembled.

In order to secure each of the cartridges 42 in the magazine 40 so that this magazine may be handled without the cartridges dropping out of it, there is provided an elongated slot 620 in the wall portion 560 adjacent one of the corner pins 584 so that a thin flexible wall section 622 is provided. The wall section 622 is formed with a raised portion 624 which acts as a resiliently biased detent to hold the cartridge 42 in place within the magazine 40. More particularly, when the sections 60, 61 are assembled together it will be seen that the detent portions 624 are provided on opposite sides of the cartridge near the edge thereof through which the tape is accessible through the opening 63. The detents 624 are arranged to be compressed inwardly as the cartridge 42 is inserted into the magazine until a vertically extending groove 626 (FIG. 19) provided in each of the walls 70, 71 of the magazine near the rear wall thereof is encountered. The detents 624 then snap into the groove 626 so as to hold the cartridge 42 in place against the rear wall 76 of the magazine 40. The cartridges 42 are thus retained within the magazine 40 in proper registration while permitting the magazine 40 to be turned or twisted at any angle during handling without the cartridges dropping out. Furthermore, the detents 624 function to hold the cartridges 42 in place within the magazine 40 during playing periods when the transducer head 126 is pressed into engagement with the magnetic tape contained within the cartridge. Thus, the detents 624 provide sufficient retaining force to hold the cartridges in place against the force of the biasing spring 422 which urges the transducer head 126 against the tape. It will also be noted that the overhanging flanges 65, 66 of the assembled cartridge which are provided by the wide end flanges 564, overhang the detent portion 624 of the opposed half section so that these detent portions are protected from damage during periods when the cartridges are not positioned within the magazine.

It is also pointed out that with the above described construction of the cartridges 42 and the magazine 40, the cartridges may readily be positioned within the magazine 40 while providing a minimum space for each cartridge. Thus, by providing the grooves 67, 68 which are offset vertically and the cooperating flanges 65, 66 on the cartridges, the cartridges are supported with a minimum of clearance between each cartridge within the magazine 40 so that an extremely compact magazine arrangement is provided wherein a large number of cartridges can be readily accommodated so as to provide the above described automatic tape changing facilities in which the individual cartridges can be rapidly played in succession in a fully automatic manner. Furthermore, it is difficult to insert of any the cartridges 42 into the magazine 40 without the opening 62 thereof facing to the rear so as to be accessible to the transducer head 126 through the opening 78 in the rear of the magazine 40. This will readily understood when it is realized that when a cartridge 42 is inserted with the opening 63 thereof facing the front of the machine, the flanges 65, 66 do not register with the corresponding grooves 67, 68 in the magazine 40. The inadvertent insertion of cartridges incorrectly into the magazine 40 is thereby prevented.

Considering now the construction of the reels 44, 45 and the manner in which the ends of the magnetic tape are secured thereto, each of these reels is provided with a plurality of reinforcing rib portions 630 which extend radially outwardly from the hub portion 53 and connect the same to a thin rim portion 632 on the outer periphery of which the tape is wound. A central web portion 634 is employed to provide a rigid reel structure.

Figure 23:
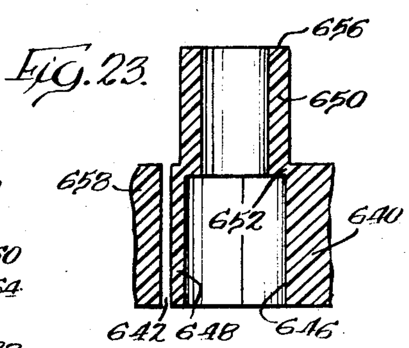
FIG. 23 is a sectional view taken along the lines 23—23 of FIG. 2.
Figure 24:
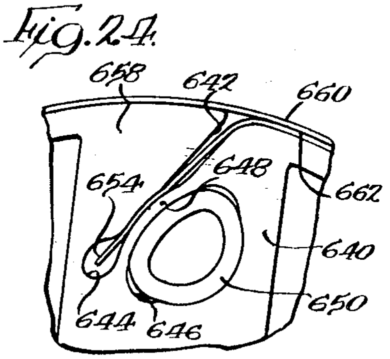
FIG. 24 is a fragmentary plan view similar to FIG. 22 but showing the end of the tape secured to the reel.

In order to secure one end of a length of magnetic tape to each reel, a relatively wide, radially extending flange portion 60 is provided between the hub 53 and the rim 632 and a narrow slot 642 is provided which extends inwardly from the periphery of the reel and communicates with an enlarged opening 644 to the flange portion 640. The flange portion 640 is also provided with an irregularly shaped opening 646 therethrough adjacent the slot 642 which defines a thin flexible clamping portion 648 adjacent one wall of the slot 642. A cylindrical drive pin 650 is provided which is originally formed in offset relation to the flange 640 and is connected thereto by means of a thin frangible neck portion 652 (FIG. 23). The end portion 654 of a length of magnetic tape is inserted into the slot 642 so that the extremity thereof extends into the opening 644. The pin 650 is then driven into the opening 646 in the flange portion 640 by striking the upper end 656 of the pin 650 a sharp blow which is sufficient to break the neck portion 652 and permit the pin 650 to be driven into the opening 646. However, when the cylindrical pin 650 is forced into the irregularly shaped opening 646, it forces the flexible clamp portion 648 against the opposite wall of the slot 642 so that the end of the tape 654 is securely clamped between the clamping strip 648 and the adjacent portion 658 of the reel. Furthermore, the end of the tape is gripped clear across the width of the tape with this construction so that the tape is not skewed as it comes out of the slot 642. In this connection it will be understood that tubular drive pin 650 is sufficiently flexible to deform to the shape shown in FIG. 24 when it is driven into the opening 646.

In accordance with a further feature of the invention, the portion 648 of the reel adjacent the slot 642 is arranged to be deformed slightly outwardly when the drive pin 650 is inserted into the aperture 646 by an amount approximately equal to the thickness of the tape 654. Accordingly, the second layer of tape 660 (FIG. 24) lays onto the underlayer 662 thereof without forming a pronounced bump which would produce an objectionable sound during reproduction. If the portion 658 were rigid then the first layer of tape 662 would produce an abrupt discontinuity and when the second layer 660 is wound thereon a slight bump in the periphery of the reel would be produced which would build up as the tape is wound on the reel and produce an objectionable discontinuity in reproduction.

The reels 44 and 45 are arranged within the cartridge 42 so that the inclined slots 642 thereof are directed toward each other and when either end of the tape is reached the tape is not bent back over the sharp edge of the corner 658. In assembly, one end of a length of magnetic tape is secured to one of the reels in the manner described heretofore and the desired length of tape is wound on this reel. The other end of the tape is then secured to another reel with the slot 642 reversely oriented, as shown in FIG. 19, and both reels are then assembled into one of the half sections 60 of the cartridge after which the other half section 61 is assembled to the section 60 so that the tape is enclosed within the sections 60, 61 with the intermediate portion thereof extending over the guide posts 604 and across the felt backing strip 602. The pins 584 and 608 are snapped into place in the corresponding apertures in the opposite section with the posts 604 located in their corresponding apertures 606 to provide the completed cartridge.

In this connection it will be noted that both the reels 44, 45 are of identical construction and both of the half sections 60, 61 of the cartridge proper are of identical construction and may be readily formed by a suitable molding operation on a mass production basis. Preferably, the reels 44, 45 are molded of medium high impact polystyrene. This material is particularly suitable for a broaching operation on the peripheral and internal surfaces thereof, as discussed hereinafter, and also permits shearing of the locking pin on impact, as discussed heretofore, without shattering the entire reel. Also, the sections 60, 61 are preferably molded of a suitable copolymer of styrene and acrylonitrile, such as Tyril No. 780, which has sufficient rigidity for the overall cartridge housing while at the same time providing sufficient flexibility to insure correct operation of the detents 624.

The selections or other material to be played are recorded on the magnetic tape after it has been secured to the reels in the manner described heretofore and the reels enclosed within the cartridge sections 60, 61. More particularly, the assembled cartridge is positioned so that a suitable drive shaft may engage one of the reels and rotate it at the desired speed while a recording head is in engagement with the tape accessible through the opening 63. If desired, the automatic tape changing mechanism itself may be used to record selections on the individual tapes in the cartridges within the magazine 40 in which case the head 126 would be suitable for magnetic recording and a suitable microphone, amplifier and equalization network provided for this recording head, as will be readily understood by those skilled in the art. Preferably, the length of the recorded selection is correlated with the length of magnetic tape in the cartridge so that the recorded selection will occupy substantially the entire length of the tape except for a few seconds at each end. Two or three seconds at the start of the selection may be necessary to permit the flywheel 232 to stabilize after the load of the changing mechanism is removed during playback.

The same selection may be recorded in both directions on the tape within the cartridge in which event the orientation of the cartridge within the magazine 40 for reproduction is of no importance since rotation of either reel will reproduce the same selection. However, it is contemplated that different selections will be recorded in different directions on the two tracks of the tape so that one selection may be reproduced by driving one reel of the cartridge and the other selection reproduced by driving the other reel thereof. Each track may, of course, be monaural or stereo, as will be readily understood by those skilled in the art. When two selections are recorded in different directions on a particular tape it is desirable to chose a pair of selections of about the same length so that full use is made of the tape and a prolonged silent period before tape changing is avoided. Different lengths of tape may, of course, be used on different reels to accommodate pairs of selections of different lengths.

Since the rotational speed of the drive shaft 162 is constant, the speed with which the tape moves past the head 126 (for either recording or reproducing) constantly increases during each selection as more tape is wound on the driven reel. While it might appear that such change in speed over the length of the selection would not introduce undesirable effects since the same speed increase will be encountered during playback as during recording, I have found that undesired effects are introduced if the percentage speed change from start to finish of the selection exceeds a certain value. This is because the amount of equalization required for different speeds varies yet the entire selection must be played back through a filter or equalization network of constant or unvarying characteristic. According to conventional magnetic recording techniques it is customary to use equalization networks in both the recording and playback amplifiers which compensate for the nonlinear frequency characteristics of the recording and reproducing heads themselves, as well as other factors of the system. These equalization networks are designed so that they provide the desired amount of compensation to reproduce the original selection faithfully over the entire frequency range of the equipment when the tape is travelling at a fixed speed. However, with the drive arrangement of the present invention, the playback equalization network is designed to give the proper level of high frequency components at the start of the selection, i.e., the slowest tape speed, then the high frequency components may become noticeably shrill at the end of the selection. On the other hand, if the correct level of high frequency components is provided at the end of the selection the high frequency components will be noticeably lacking at the lower tape speed at the beginning of the selection. These conflicting requirements can, however, be resolved in accordance with a further aspect of the invention by limiting the percentage change in speed of the tape past the head 126 over the entire length of the taped selection. I have found that if this change in tape speed is limited to a maximum value in the order of 25 percent (from start to finish of the recorded selection) a conventional playback equalization network can be employed to reproduce the entire selection without loss of fidelity at either the lowest or the highest tape speeds. However, if a speed increase of 50 percent or more is permitted then either the high frequency response is too accentuated at the highest tape speed or the high frequency response is not great enough at the lowest tape speed. Accordingly, the tapes in the cartridges 42 of the present invention are preferably recorded under such conditions that the percentage change in tape speed from start to finish of the selection is in the order of 25 percent.

The above-described change in tape speed is influenced by a number of factors. For a given length of selection it is desirable to have as slow a tape speed as possible at the start of the selection. However, the tape speed cannot be too slow or else the fidelity of reproduction will be lost. With a conventional playback head and 1 mil Mylar tape a minimum tape speed in the order of 3½ inches per second is probably necessary. If ½-mil tape with good grain structure is used and a reproducing head having a very narrow gap is used, the minimum tape speed may be as low as 1⅞ inches per second.

Once the minimum tape speed has been determined this speed may be achieved by proper choice of diameter of the driven reel in the cartridge 42 and the speed of rotation of the flywheel 232. If the flywheel 232 is driven at a high speed then the diameter of the reel must be very small to get the desired minimum tape speed and with a small diameter reel the change in tape speed over a recorded selection of only 3 to 4 minutes will be excessive with the resultant loss in fidelity discussed above. On the other hand, if a large diameter reel is used so that the build up of tape on the reel during playback is small (i.e., a small percentage change in speed) then the fly wheel 232 must be driven too slowly to provide the desired stabilizing action. A certain minimum inertia of the flywheel is required to equalize or smooth or variations in friction between the head 126 and the tape. Since the head pressure on the tape may be in the order of 15 grams the load on the flywheel is substantially higher than that experienced in phonograph reproduction where needle pressure is only a few grams and this head pressure is acting over a large area. Accordingly, a considerable amount of flywheel inertia is required to drive the tape smoothly past the head 126. This flywheel inertia cannot be achieved at low flywheel speed unless a large flywheel mass is used. However, a large flywheel mass is undesirable in a portable unit such as that of the present invention. I have found that a flywheel speed of from 40 to 80 r.p.m. may satisfactorily be employed with an appropriate reel diameter to obtain the desired minimum tape speed and not exceed the maximum percentage speed change over the length of the recorded selection. By way of example only, I have found that with a standard gap head and 1-mil tape the flywheel 232 may have a speed of 50 r.p.m., an outer diameter of 6 inches and a mass of 2 pounds and the diameter of the reels 44, 45 may be approximately 1½ inches without causing a detectable change in high frequency response with a recorded selection of approximately 5 minutes duration. It will be understood, of course, that these parameters may vary considerably depending upon the factors discussed above.

It will be recognized that the above discussed range of flywheel speeds is considerably less than the capstan speed of conventional tape recorders which is usually in the order of 300 r.p.m. If the capstan of a conventional recorder is out of round a flutter at 300 cycles per second is produced which directly interferes with the usable frequency spectrum of the recorded selection. With a flywheel speed of from 40 to 80 r.p.m. any variations in flywheel speed will occur at a much lower frequency. In this connection it is noted that the peripheral surface **640*a* (FIG. 22) and the central openings 56, 57 of the reels 44, 45 are preferably formed by a suitable broaching operation so that these surfaces will be truly concentric with the drive shaft head 168. It is also pointed out that in capstan drive arrangements a side pressure of several pounds is required to grip the tape sufficiently so that it can be moved past the reproducing head without slipping. The arrangement of the present invention avoids such side pressure by driving the reels directly and permits the use of an elongated drive shaft 162** so that a number of cartridges can be accommodated for automatic changing purposes without producing bending or whip of the elongated shaft and without slippage between the drive mechanism and the tape in each cartridge.

Figure 25:
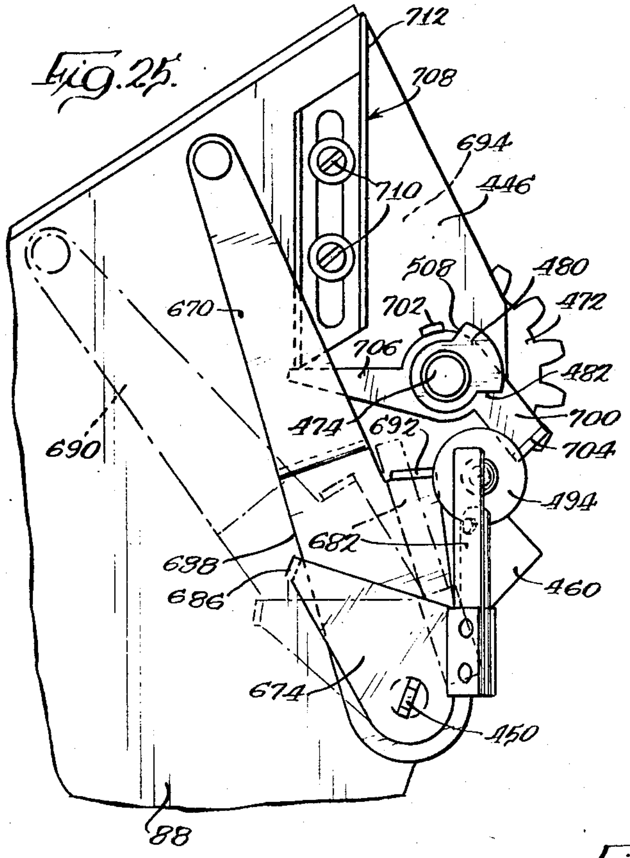
FIG. 25 is a right side view of an alternative changing mechanism of the present invention wherein a single control lever is employed.
Figure 26:
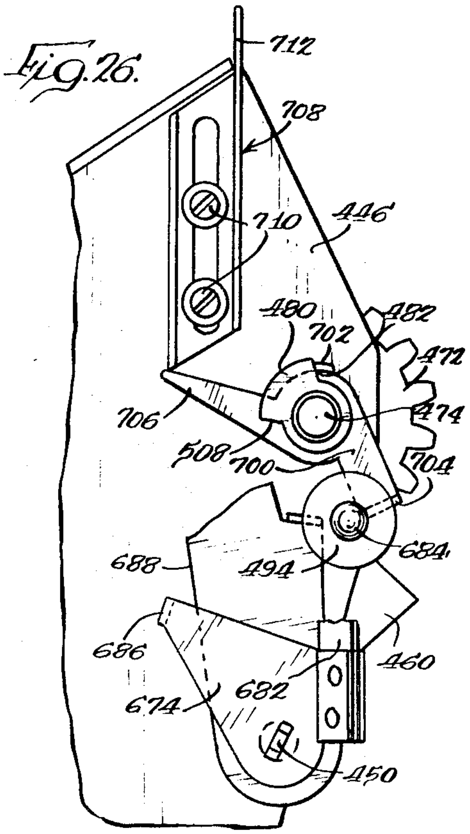
FIG. 26 is a right side view similar to FIG. 25 but showing the parts in a different position.
Figure 27:
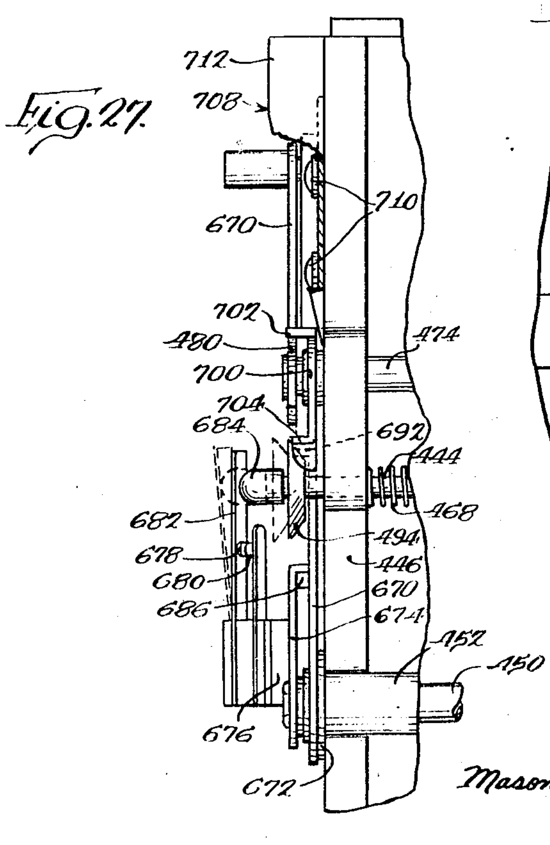
FIG. 27 is a fragmentary rear view of the alternative arrangement of FIG. 25.

In FIGS. 25 to 27, inclusive, of the drawings, there is shown an alternative embodiment of the automatic tape changer of the present invention wherein the functions of the on-off lever and the manual reject lever in the embodiment of FIG. 1 are combined in one control member. Referring to these figures, a control lever 670 is provided which is pivotally mounted on the end of the shaft 450 outboard of the flange 446 by means of the bushing 672. A reject bracket 674 is connected to the end of the shaft 450 and the bracket 674 is provided with a right-angle flange portion 676 on which the switch contacts 678 and 680 are mounted. The switch contact arm 682 which carries the contact 678 is arranged to be engaged by a cap 684 of insulating material positioned on the end of the shaft 444 when this shaft is moved transversely to the left as view in FIG. 27. The reject bracket 674 is also provided with an inturned flange portion 686 which is adapted to be engaged by the edge 688 (FIG. 25) of the lever 670 when this lever is moved downwardly to the position shown in dotted lines at 690 in FIG. 25. The control lever 670 is also provided with an out-turned flange portion 692 which is adapted to engage the conical surface of the camming hub 494 when the lever 670 is moved upwardly to the position shown in FIG. 26 so that the shaft 444 is cammed to the left as viewed in FIG. 27. When this occurs the transducer head 126 is removed from the tape being played in the manner described in detail heretofore in connection with the embodiment of FIG. 1. Also, when the shaft 444 is moved to the left as viewed in FIG. 27 the cap 684 engages the switch arm 682 and opens the switch contact 678, 680 so that the motor 234 is deenergized. Accordingly, the machine may be turned off at any time, the motor deenergized and the transducer head held out of engagement with the tape by moving the control member 670 up to the off position shown in FIG. 26. Furthermore, the shaft 444 is held in the off position by the spring bias offered by the spring 464 which urges the side of the camming hub 494 against the flange 692 so that the lever 670 is held in the off position. This permits the gear 472 to be rotated so that the magazine 40 may be removed from the well 84.

When it is desired to change from one cartridge to another by manual rejection, the control member 670 is moved downwardly to the position shown in dotted lines at 690 in FIG. 25. As this occurs, the edge 688 of the member 670 engages the lug 686 on the reject bracket 674 so that the shaft 450 is rotated by a fixed increment. This incremental movement of the shaft 450 is effective to cam the shaft 444 to the left by engagement of the bracket 460 on the cam follower 350 with the hub 442 so that the transducer head 126 is withdrawn from the tape in the manner described in detail heretofore and the ratchet 512 engages one of the teeth of the gear 472 so as to move this gear to the next step and elevate the magazine so that the next cartridge is in alignment with the head portion 168. However, when the control member 670 is moved downwardly to the manual reject position 690, the switch contacts which are secured to the bracket 674 are moved out of alignment with the end cap 684 in the shaft 444. Accordingly, when this shaft is moved transversely to the left the cap portion 684 does not engage the contact arm 682 and hence does not open the contact 678 and 680 so that the motor 234 remains energized.

In order to provide an indication that all of the cartridges in the magazine 40 have been played, and also to provide an automatic shutoff mechanism responsive to the tape changing cycle which is initiated after the last cartridge has been played, there is provided a shutoff lever 700 which is pivotally mounted on the shaft 474 and is provided with an out-turned lug 702 which is adapted to be engaged by one of the edges 482 or 508 of the cam plate 480 secured to the shaft 474. Accordingly, as the gear 472 is moved to the shutoff position during the last tape changing cycle, the edge 482 of the cam plate 480 engages the lug 702 and pivots the lever 700 to the position shown in FIG. 26 in which position an end flange 704 on the shutoff bracket 700 engages the camming hub 494 and shifts the shaft 444 laterally. This transverse movement of the shaft 444 is again effective to open the switch contacts 678, 680 and remove the transducer head, as described in detail above. The bracket 700 is also provided with an extending finger 706 which is adapted to engage the bottom end of an indicator flag indicated generally at 708. The flag 708 is of U-shaped cross section and is slidably mounted to the side wall 88 of the casting member 86 under the heads of the mounting screws 710. Accordingly, when the shutoff bracket 700 is moved to the shutoff position shown in FIG. 26 the finger portion 706 thereof moves the flag 708 upwardly so that an upper indicator portion 712 thereof projects through a corresponding opening in the cover 96 so as to provide an indication that all of the cartridges in the magazine have been played and that the magazine 40 may then be removed from the well 84. When the magazine 40 is again inserted into the well, the rack teeth 470 engage the teeth of the gear 472 and rotate this gear so that the cam plate 480 is rotated in a counterclockwise direction, as viewed in FIG. 26. As the bottommost position of the magazine is reached, the edge 508 of the cam plate 480 engages the lug 702 and pivots the shutoff lever 700 back to its inoperative position shown in FIG. 25. When this occurs the shaft 444 is shifted to the right, as viewed in FIG. 27 so that the motor is energized and the transducer head is moved into engagement with the tape in the uppermost slot in the magazine. When the shutoff lever 700 is returned to its inactive position shown in FIG. 25 the flag 708 falls of its own weight to its inactive position within the cover 96, thus indicating that the machine has been loaded.

Figure 28:
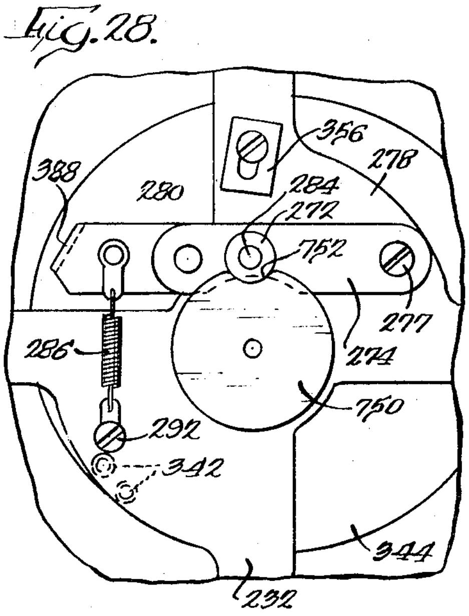
FIG. 28 is a fragmentary plan view similar to FIG. 12 but illustrating an alternative arrangement for controlling the automatic tape changing cycle of the machine.

In the event that the magazine 40 is fully loaded and an empty slot is left at some intermediate point in the magazine, the mechanism described thus far will function only to shift the magazine upwardly one step so that the head 126 is aligned with the empty slot. Under these conditions the manually actuated reject lever 532 may be used to move the magazine 40 upwardly until the next cartridge tape is aligned with the head 126. In FIG. 28 there is shown an alternative embodiment wherein the mechanism itself is effective to recycle when an empty slot is encountered so that the random placed cartridges in the magazine 40 may be played in a fully automatic manner and the machine turned off even through one or more cartridge receiving slots in the magazine are empty. More particularly, in the embodiment of FIG. 28 the plate 220, referred to previously, is replaced by a plate 750 which is secured to the bottom end of the drive shaft 162, in the same manner as the plate 220, and is provided with a single notch 752. Other parts of the embodiment of FIG. 28 are the same as previously described and have been given the same reference numerals with the exception that the latching member 324 and extending finger portion 320 of the lever 280 are eliminated in the embodiment of FIG. 28.

Considering the operation of the embodiment of FIG. 28, when the end of the tape being played is reached, the plate 750 is restrained and since the flywheel 232 continues to rotate the roller 272 moves out of the notch 752 and rides on the periphery of the plate 750. The resultant movement of the lever 280 positions the post 340 to engage one of the pins 342 so that the cam plate 344 is rotated and an automatic change cycle is initiated. If the next slot in the magazine 40 is occupied by a cartridge there will be a slight load on the plate 750 due to the pressure of the head 126 on the tape in the cartridge. The spring 286 urges the roller 272 against the edge of the plate 750 with a slight force which is overcome by this tape load so that when the lever 280 is cammed downwardly by engagement of the edge 390 (FIG. 17) with the reset finger 386 the post 340 is disengaged from the pin 342 and the roller 272 rolls along the edge of the plate 750 until it drops into the notch 752.

If the next magazine slot is empty there is no load whatsoever on the drive shaft 162 and the force of the spring 286 is sufficient to press the roller 272 against the edge of the plate 750 and cause this plate to rotate with the flywheel. With no relative movement between the roller 272 and plate 750 the post 340 remains in a position to pick up one of the pins 342 after the camming action of the members 386, 390 and hence the cam plate 344 is moved through another cycle. This action continues until an occupied magazine slot is encountered whereupon the increased load on the drive shaft 162, due to pressure exerted on the tape by the head 126 is sufficient to overcome the force of the spring 286 and cause the roller to move into the notch 752 so that movement of the cam plate 344 is terminated. While the frictional drag of the tape against the head 126 is sufficient to overcome the spring 286, it will, of course, be understood that this tape drag is insufficient to move the roller 272 out of the notch 752. It is only when the end of the tape is reached and the plate 750 is positively restrained by the anchored end of the tape just completed that a force of sufficient magnitude is developed to move the roller 272 out of the notch 752, thereby initiating an automatic change cycle. If only a single pin 342 were provided, it will evident that in the embodiment of FIG. 28 a condition could occur wherein the post 340 would never engage the pin to initiate an automatic change cycle. Thus, if only a single pin 342 is provided and the lever 280 is tripped and moves outwardly just after the post 340 has passed this pin, the roller 272 will move back into the notch 752 before the post 340 can engage the pin. However, by providing two spaced apart pins 342 this condition is avoided since one or the other of the pins 342 will always be engaged by the post 342 during the period when the roller 272 is moving along the outer periphery of the plate 750 and the cycle thus initiated. The cam plate 344 is provided with a flat portion suitably placed so that movement of the cam plate 344 is not affected by which one of the pins 342 is engaged.

While there have been illustrated and described several embodiments of the present invention, it will be apparent that various changes and modifications thereof will occur to those skilled in the art. It is intended in the appended claims to cover all such changes and modifications as fall within the true spirit and scope of the present invention.

I claim:

1. An apparatus for automatically playing magnetic tape cartridges, comprising means defining a magazine receiving well, a magazine insertable into said well with either of two orientations, a plurality of magnetic tape cartridges positioned in predetermined relation in said magazine and each having reel means on which a length of magnetic tape is wound, each magnetic tape having a plurality of sound tracks thereon, and automatic tape player means for successively playing one sound track of each of said magnetic tapes in a predetermined order.

2. An apparatus for automatically playing magnetic tape cartridges, comprising means defining a magazine receiving well, a magazine insertable into said well with either of two orientations, a plurality of magnetic tape cartridges positioned in predetermined relation in said magazine and each having a pair of reels on which a length of magnetic tape is wound, and automatic tape player means for successively playing each of the magnetic tapes in said cartridges in one direction in the order in which said cartridges are arranged in said magazine when said magazine is positioned in said well in a first of said two orientations and upon removal and reinsertion of the magazine into said well in the other of said two orientations for playing said tapes in the other direction in the reverse order.

3. An apparatus for automatically playing magnetic tape cartridges, comprising means defining a magazine receiving well, a magazine insertable into said well in either of two orientations, a plurality of magnetic tape cartridges positioned in predetermined relation in said magazine and each having a pair of reels on which a length of magnetic tape is wound, each of said magnetic tapes being initially wound on one of said pair of reels in said cartridges, and tape player means for first successively playing the magnetic tapes in said cartridges in one direction by winding each tape onto the other reel in said cartridges in a sequence determined by the position of each cartridge within said magazine and then successively playing the magnetic tapes in said cartridges in the other direction by winding each tape back onto the reel on which the tape was originally wound and in a sequence which is the reverse of said predetermined sequence.

4. An apparatus for automatically playing magnetic tape cartridges, comprising means defining a magazine receiving well, a magazine insertable into said well in either of two orientations, a plurality of magnetic tape cartridges positioned in predetermined relation in said magazine and each having a pair of reels on which a length of magnetic tape is wound, driving means, and tape player means for playing the magnetic tapes in said cartridges in one direction by successively connecting said drive means to the other reel in said cartridges, thereby to wind each tape on the other reel in said cartridges in a sequence determined by the position of each cartridge in said magazine, and then playing the magnetic tapes in said cartridges in the other direction by successively connecting said driving means to said one reel in each cartridge in a sequence which is the reverse of said predetermined sequence.

5. An apparatus for automatically playing magnetic tape cartridges, comprising means defining a magazine receiving well, a magazine insertable into said well in either of two orientations, a plurality of magnetic tape cartridges positioned in predetermined relation in said magazine and each having a pair of reels on which a length of magnetic tape is wound, said reels having central apertures therein and said cartridges having openings therein providing access to said central apertures, a drive shaft having means adapted to interlock with the central apertures of any one of said reels to drive the same at a constant speed of rotation, and tape player means for playing the magnetic tapes in said cartridges in one direction by successively connecting said drive shaft means to one reel in said cartridges, thereby to wind each tape onto said one reel in said cartridges, and then playing the magnetic tapes in said cartridges in the other direction by successively connecting said drive shaft means to the other reel in said cartridge, thereby to wind each tape back onto the reel on which the tape was originally wound.

6. In an apparatus for automatically playing magnetic tape cartridges each having reel means on which a length of magnetic tape is wound, the combination of, a flywheel, means for rotating said flywheel, drive means normally connected to said flywheel for moving the tape in one of said cartridges, cycling means for moving said drive means into operative relation with different ones of said cartridges, and control means responsive to the completion of play of the tape in said one cartridge for disconnecting said flywheel from said drive means and connecting said flywheel to said cycling means.

7. An apparatus for automatically playing a group of magnetic tape cartridges, comprising a plurality of magnetic tape cartridges each containing a pair of reels on which a length of magnetic tape is wound with the ends thereof secured to said reels, a magazine having means defining a plurality of locations at each of which one of said cartridges may be positioned, means for winding the magnetic tape in one of said cartridges positioned at one of said locations in said magazine onto one reel in said one cartridge, automatic cartridge changing means responsive to completion of play of the tape in said one cartridge for causing relative movement between said magazine and said winding means to that said winding means is in position to wind the magnetic tape of a cartridge positioned at a different location in said magazine, and means responsive to the absence of a cartridge at said different location for causing said automatic cartridge changing means to move said magazine relative to said winding means until said winding means is positioned at the location of another one of said cartridges in said magazine.

8. In an apparatus for automatically playing magnetic tape cartridges, the combination of, a magazine, a plurality of magnetic tape cartridges positioned in said magazine and each including reel means on which a length of magnetic tape is wound, means for playing the tape in one of said cartridges, automatic tape cartridge changing means responsive to completion of play of the tape in said one cartridge for causing relative movement between said magazine and said tape playing means so that the tape in another one of said cartridges is played, and control means operable independently of said automatic cartridge changing means for causing relative movement between said magazine and said tape playing means without rewinding the tape in said one cartridge.

9. An apparatus for automatically playing magnetic tape cartridges, comprising a plurality of magnetic tape cartridges each containing a pair of reels on which a length of magnetic tape is wound with the ends thereof secured to said reels, each of said reels having a central aperture therein and said cartridges having openings therein providing access to said central apertures, a drive shaft, cooperating means on said drive shaft and said central apertures of said reels for interlocking any one of said reels with said drive shaft to drive the same, means for positioning said plurality of cartridges in spaced relation with said drive shaft extending into the central aperture of one reel in one of said cartridges, means for driving said drive shaft so that the magnetic tape in said one cartridge is wound onto said one reel, automatic tape changing means responsive to the increase in tension on said drive shaft when the end of the tape in said one cartridge is reached for causing relative movement between said plurality of cartridges and said drive shaft to position said interlocking means for engagement with a reel in a different one of said cartridges, and tape cartridge reject means operable during periods when said drive shaft is being driven for causing relative movement between said plurality of cartridges and said drive shaft to position said interlocking means for engagement with a reel in a different one of said cartridges.

10. An apparatus for automatically playing magnetic tape cartridges, comprising a plurality of magnetic tape cartridges each containing a pair of reels on which a length of magnetic tape is wound, means for winding the magnetic tape in one of said cartridges onto one reel in said one cartridge, automatic cartridge changing means responsive to completion of play of the tape in said one cartridge for causing relative movement between said plurality of cartridges and said winding means so that said winding means is effective to wind the magnetic tape in a different one of said cartridges onto said one reel thereof, and tape cartridge reject means operable during the playing of tape in one of said cartridges for causing relative movement between said plurality of cartridges and said winding means so that said winding means is effective to wind the magnetic tape in another one of said cartridges onto said one reel thereof.

11. An apparatus for automatically playing magnetic tape cartridges, comprising a plurality of magnetic tape cartridges each containing a pair of reels on which a length of magnetic tape is wound with the ends thereof secured to said reels, means for winding the magnetic tape in one of said cartridges onto one reel in said one cartridge, a transducer head in engagement with the tape in said one cartridge as it is wound on said one reel, and automatic cartridge changing means responsive to the increase in load on said winding means when the end of the tape in said one cartridge is reached for causing relative movement between said head and said plurality of cartridges to position said head in engagement with the tape in a different one of said cartridges.

12. An apparatus for automatically playing magnetic tape cartridges, comprising a plurality of magnetic tape cartridges each containing a pair of reels on which a length of magnetic tape is wound with the ends thereof secured to said reels, means for winding the magnetic tape in one of said cartridges onto one reel in said one cartridge, and automatic cartridge changing means responsive to completion of play of the tape in said one cartridge for causing relative movement between said plurality of cartridges and said winding means so that said winding means is effective to wind the magnetic tape in a different one of said cartridges onto the corresponding reel thereof without rewinding the tape in said one cartridge.

13. An apparatus for automatically playing magnetic tape cartridges, comprising a magazine, a plurality of magnetic tape cartridges positioned in predetermined relation in said magazine and each having a pair of reels on which a length of magnetic tape is wound with the ends thereof connected to said pair of reels, a drive shaft having means adapted to interlock with any one of said reels, means for positioning said magazine with said drive shaft interlocking means adapted to drive said one reel of one of said cartridges, means for rotating said drive shaft so that the tape in said one cartridge is wound on said one reel, and means responsive to the increased load on said drive shaft when the end of the tape in said one cartridge is reached for causing relative movement between said magazine and said interlocking means so that said interlocking means is positioned for engagement with a reel on a different one of said cartridges.

14. In an apparatus for automatically playing magnetic tape cartridges, a plurality of flat rectangular magnetic tape cartridges each having an opening in one edge thereof through which magnetic tape within the cartridge is accessible, a magazine for holding said cartridges in predetermined spaced relation having a pair of sidewalls and a rear wall, said rear wall having a slot therein, and means for supporting said cartridges in said magazine with the edge opening thereof facing said slot in said rear wall of said magazine while permitting each of said cartridges to be removed from said magazine, turned over and reinserted with the edge opening thereof still facing said slot.

15. In an apparatus for automatically playing a series of magnetic tape cartridges, the combination of, a transducer head, automatic tape cartridge changing means operative during successive cartridge changing cycles to position said head in operative relation to the tape in different ones of the cartridges, and manual reject means operable during periods when a tape in one of said cartridges is being played for positioning said head in operative relation to the tape in another one of said cartridges while the tape in said rejected cartridge remains unchanged in position within the cartridge after said head is moved out of operative engagement therewith.

16. In an apparatus for automatically playing a series of magnetic tape cartridges, the combination of, a transducer head, a well, a holder for a plurality of magnetic tape cartridges, means for positioning said holder in said well with said head in operative relation with one of said cartridges, automatic tape cartridge changing means operative during successive cartridge changing cycles to position said head in operative relation to the tape in different ones of the cartridges, and means for preventing said holder from being removed from said well while a tape in one of said cartridges is being played.

17. An apparatus for automatically playing magnetic tape cartridges, comprising means defining a magazine receiving well, a magazine insertable into said well, a plurality of magnetic tape cartridges positioned in said magazine and each having reel means on which a length of magnetic tape is wound, and tape player means responsive to the positioning of said magazine at a predetermined location within said well for automatically initiating playing of the tape in the cartridge at said predetermined location.

18. An apparatus for automatically playing a group of magnetic tape cartridges, comprising a magazine having means defining a plurality of locations at each of which one of said cartridges may be positioned, means for playing the magnetic tape in one of said cartridges positioned at one of said locations in said magazine, automatic cartridge changing means responsive to completion of play of the tape in said one cartridge for causing relative movement between said magazine and said playing means so that said playing means is in position to play the magnetic tape of a cartridge positioned at a different location in said magazine, and means responsive to the absence of a cartridge at said different location for controlling said automatic cartridge changing means to cause movement of said magazine until said playing means is positioned at the location of another one of said cartridges in said magazine.

19. In an apparatus for automatically playing magnetic tape cartridges each having reel means on which a length of magnetic tape is wound, the combination of, drive means for moving the tape in one of said cartridges, automatic tape cartridge changing means responsive to completion of play of the tape in said one cartridge for moving said drive means out of operative relation with said one cartridge and into operative relation with another of said cartridges, and tape cartridge reject means operable during periods when said drive means is moving tape and independently of said automatic cartridge changing means for positioning said drive means in operative relation with a different one of said cartridges while maintaining the tape in the previously driven cartridge at the point at which said drive means is disengaged therefrom.

20. The combination of claim 19, wherein said cartridges each include a pair of reels on which a length of tape is wound with the ends thereof secured to said reels, and said automatic tape cartridge changing means is responsive to the increase in tension in the tape in said one cartridge when the end of said tape is reached.

21. An apparatus for automatically playing magnetic tape cartridges, comprising a plurality of magnetic tape cartridges each containing a pair of reels on which a length of magnetic tape is wound with the ends thereof secured to said reels, means for winding the magnetic tape in one of said cartridges onto one reel in said one cartridge, and automatic cartridge changing means responsive to the increase in load on said winding means when the end of the tape in said one cartridge is reached for causing relative movement between said plurality of cartridges and said winding means so that said winding means is effective to wind the magnetic tape in a different one of said cartridges onto the corresponding reel thereof without rewinding the tape in said one cartridge.

22. The apparatus of claim 21, which includes means for indicating the position of said winding means with respect to said plurality of magnetic tape cartridges.

23. An apparatus for automatically playing magnetic tape cartridges, comprising a magazine, a plurality of magnetic tape cartridges positioned in predetermined spaced relation in said magazine and each having a pair of reels on which a length of magnetic tape is wound, said magazine having a vertically extending slot in one wall thereof and said cartridges having openings in the edge thereof facing said slot so that magnetic tape within said cartridges is accessible through said slot and said openings, a reproducing head, means for causing relative movement between said head and said magazine to bring said head into alignment with magnetic tape in different ones of said cartridges, means for moving said head into engagement with the aligned magnetic tape, and means for driving one of the reels of the aligned cartridge so that the aligned tape is wound on said one reel.

24. The apparatus of claim 23, wherein each of said magnetic tapes has a pair of sound channels thereon, one of said sound channels being reproduced by said head as said aligned tape is wound on said one reel, and means whereby said magazine may be inverted and said driving means moved into engagement with the other reel of the aligned cartridge so that the aligned tape is rewound on said other reel and said other sound channel reproduced.

25. An apparatus for automatically playing magnetic tape cartridges, comprising means defining a magazine receiving well, a magazine insertable into said well with either of two orientations, a plurality of magnetic tape cartridges positioned in predetermined relation in said magazine and each having first and second reels on which a length of magnetic tape is wound, said magnetic tape having a pair of sound channels thereon, said magazine having a slot in one wall thereof and said cartridges having openings therein facing said slot so that said magnetic tape within said cartridge is accessible through said slot and said openings, means for automatically playing one sound channel of each of said magnetic tapes in succession in the order in which the corresponding cartridges are positioned in said magazine when said magazine is inserted into said well with one of said two orientations, and means for automatically playing the other sound channel of said magnetic tapes in the reverse order when said magazine is inserted into said well with the other of said two orientations.

26. The apparatus of claim 25, which includes means for moving said magazine within said well to a number of predetermined positions corresponding to the positions of said cartridges within said magazine, and means for playing said magnetic tapes in succession when said magazine is moved to said plurality of positions, said magazine moving means being operative to move said magazine to said predetermined positions with either one of said two orientations of said magazine within said well, whereby one sound channel of said magnetic tapes is played in predetermined order when said magazine has one of said two orientations in said well and the other sound channel of said magnetic tapes is played in the reverse order when said magazine has the other of said two orientations in said well.

27. In an apparatus for automatically playing a series of magnetic tape cartridges, the combination of a transducer head, a well, a holder for a plurality of magnetic tape cartridges, means for positioning said holder in said well with said head in operative relation with the tape in one of said cartridges, automatic tape cartridge changing means operative during successive cartridge changing cycles to position said head in operative relation to the tape in different ones of the cartridges, and means operative when the tape in a predetermined one of said cartridges has been played for moving said holder to an unloading position in which said holder may be moved from said well.

28. The combination of claim 27, which includes means for preventing said holder from being removed from said well while a tape in one of said cartridges is being played.

29. An apparatus for automatically playing magnetic tape cartridges, comprising a plurality of magnetic tape cartridges each having a pair of reels on which a length of magnetic tape is wound, and tape player means including automatic cartridge changing means for successively playing the tapes in said cartridges while winding the tape in each cartridge from one of said reels onto the other of said reels and then successively playing the tapes in said cartridges in the other direction while winding the tape in each cartridge from said other reel back onto said one reel.

30. The apparatus of claim 29, wherein each of said tapes has a pair of sound channels therein, one of said sound channels being played as said tapes are wound from said one reel onto said other reel and the other of said sound channels being played as said tapes are wound from said other reel onto said one reel.

31. An apparatus for automatically playing a group of magnetic tape cartridges, comprising a base member, a removable magazine having means defining a plurality of locations at each of which one of said cartridges may be positioned, a transducer head positioned on said base member, means for positioning said magazine on said base member with said transducer head in position to engage the tape in one of said cartridges, means including said head for playing the tape in said one cartridge, and automatic cartridge changing means responsive to completion of play of the tape in said one cartridge for moving said magazine relative to said base member so that said head is positioned to play the magnetic tape of a cartridge positioned at a different location in said magazine.

32. The combination of claim 31, which includes means responsive to the absence of a cartridge at said different location for moving said magazine relative to said base member until said head is positioned to play the tape in a cartridge positioned at another one of said locations in said magazine.

33. In an apparatus for automatically playing magnetic tape cartridges each having reel means on which a length of magnetic tape is wound, the combination of, drive means for moving the tape in one of said cartridges, automatic tape cartridge changing means responsive to completion of play of the tape in said one cartridge for moving said drive means out of operative relation with said one cartridge and into operative relation another of said cartridges, and tape cartridge reject means operable during periods when said drive means is moving tape for positioning said drive means in operative relation with a different one of said cartridges while the tape in said rejected cartridge remains in the same position within the cartridge after said drive means is moved out of operative relation therewith.

34. The combination of claim 33, wherein said cartridges each include a pair of reels on which a length of tape is wound with the ends thereof secured to said reels, and said automatic tape cartridge changing means is responsive to the increase in tension in the tape in said one cartridge when the end of said tape is reached.

35. An apparatus for automatically playing magnetic tape cartridges, comprising a plurality of magnetic tape cartridges each containing a pair of reels on which a length of magnetic tape is wound with the ends thereof secured to said reels, each of said reels having a central aperture therein and said cartridges having openings therein providing access to said central apertures, a vertically extending sleeve, a drive shaft rotatably mounted in said sleeve, cooperating means on said drive shaft and said central apertures of said reels for interlocking any one of said reels with said drive shaft to drive the same, means for positioning said plurality of cartridges in spaced relation with said drive shaft extending into the central aperture of one reel in one of said cartridges, a member secured to the bottom end of said drive shaft, a flywheel rotatably mounted on said sleeve and riding on said member, means for rotating said flywheel, means normally interconnecting said flywheel and said drive shaft so that the magnetic tape in said one cartridge is wound on said one reel, and means responsive to the increased load on said drive shaft when the end of the tape in said one cartridge is reached for disengaging said flywheel from said drive shaft and causing relative movement between said plurality of cartridges and said interlocking means to position the same for engagement with a reel in a different one of said cartridges.

36. The arrangement set forth in claim 35, which includes means for minimizing friction between said flywheel and said member to prevent tearing of the tape as said flywheel is disengaged from said drive shaft.

37. The arrangement set forth in claim 35, which includes ball bearing means between said flywheel and said member to minimize frictional drag therebetween.

38. An apparatus for automatically playing a group of magnetic tape cartridges, comprising a removable magazine having means defining a plurality of locations at each of which one of said cartridges may be positioned, tape playing means including a transducer head, means for biasing said head into engagement with the magnetic tape in one of said cartridges positioned at one of said locations in said magazine, and automatic cartridge changing means responsive to completion of play of the tape in said one cartridge for causing movement of said magazine so that said head is positioned to play the magnetic tape of a cartridge positioned at a different location in said magazine.

39. The combination of claim 38, which includes means for retaining said cartridges in position in said magazine against the force of said head biasing means.

40. The combination of claim 38, which includes means responsive to the absence of a cartridge at said different location for causing relative movement between said magazine and said head until said head is positioned to play the magnetic tape in another one of said cartridges.

41. In an apparatus for automatically playing a plurality of magnetic tape cartridges in succession, the combination of, a drive shaft, a flywheel mounted for rotation on the same axis as said drive shaft, means for rotating said flywheel, means normally connecting said flywheel with said drive shaft, and means responsive to an increased load on said drive shaft for disconnecting said flywheel therefrom.

42. The combination of claim 41, wherein said disconnecting means includes a pivotally mounted lever on said flywheel which is movable from a driving position in engagement with said drive shaft to a disengaged position in response to said increased load on said drive shaft.

43. The combination of claim 42, which includes a cycling member movable over a predetermined path during a tape cartridge changing cycle, and means responsive to movement of said lever to said disengaged position for connecting said flywheel to said cycling member so that said cycling member is moved over said path.

44. The combination of claim 43, which includes latching means for holding said lever in said disengaged position, and reset means for returning said lever to said driving position.

45. The combination of claim 44, wherein said reset means comprises a reset member, means on said cycling member for moving said reset member from a first position to a second position as said cycling member moves along said path, means responsive to movement of said reset member to said second position for unlatching said lever, and means carried by said flywheel for returning said reset member to said first position.

46. In an apparatus for automatically playing magnetic tape cartridges, a plurality of flat rectangular magnetic tape cartridges each having vertically offset positioning flanges on opposite ends thereof, a magazine for holding said cartridges in predetermined spaced relation having a pair of vertically extending side walls, and means defining a series of cartridge supporting ledges on said side walls, said ledges on one of said side walls being offset vertically with respect to said ledges on the other side wall so as to support said cartridges substantially horizontally by engagement of said positioning flanges with said offset ledges.

47. The combination of claim 46, which includes interlocking means on said cartridges and said vertically extending side walls for holding said cartridges in a predetermined position in said magazine.

48. The combination of claim 46, which includes means defining deflectable positioning lugs on the ends of said cartridges, and means on said side walls cooperating with said positioning lugs for holding said cartridges in predetermined positions in said magazine.

49. The combination of claim 46, wherein each of said cartridges has an opening in one edge thereof through which magnetic tape within the cartridge is accessible, and said magazine has a vertically extending slot in alignment with said openings in said cartridges.

50. The combination of claim 49, wherein said positioning flanges of said cartridges are so arranged with respect to said supporting ledges that said cartridges can be horizontally inserted into said magazine with the edge opening thereof facing said vertical slot in said magazine.

51. In an apparatus for automatically playing magnetic tape cartridges each having reel means on which a length of magnetic tape is wound, the combination of, drive means for moving the tape in one of said cartridges, automatic tape cartridge changing means including a cycling member mounted for rotation about a fixed axis and movable over a predetermined path in one direction about said axis during a tape cartridge changing cycle, means responsive to the completion of play of the tape in said one cartridge for moving said member over said predetermined path, and means responsive to movement of said member in said one direction over said path for moving said drive means out of operative relation with said one cartridge and into operative relation with another of said cartridges.

52. The combination of claim 51, which includes a transducer head normally in engagement with the tape in said one cartridge, and means responsive to movement of said cycling member over said path for moving said head out of engagement with the tape in said one cartridge and into engagement with the tape in said other cartridge.

53. The combination of claim 51, wherein said plurality of cartridges are positioned within a magazine, and means responsive to movement of said cycling member during a cartridge changing cycle for moving said magazine relative to said drive means.

54. The combination of claim 53, which includes means for limiting the total amount of movement of said magazine during successive cartridge changing cycles.

55. The combination of claim 53, which includes means responsive to the absence of a cartridge at a particular location in said magazine for moving said cycling member over said path until said drive means is positioned in operative relation to another cartridge in said magazine.

56. The combination of claim 53, which includes means for preventing movement of said magazine during periods when a tape in one of said cartridges is being played.

57. In an apparatus for automatically playing magnetic tape cartridges each having reel means on which a length of magnetic tape is wound, the combination of, drive means including a flywheel for moving the tape in each of said cartridges, said drive means being initially positioned in operative relation to the tape in one of said cartridges, and means responsive to the completion of play of the tape in said one cartridge for disconnecting said flywheel from said drive means.

58. The combination of claim 57, wherein said cartridges each contain a pair of reels on which a length of magnetic tape is wound with the ends thereof secured to said reels, said drive means is interlocked with one of said reels in said one cartridge, and said disconnecting means is responsive to the increase in tension when the end of the tape in said one cartridge is reached.

59. The combination of claim 57, wherein said cartridges each contain a pair of reels on which a length of magnetic tape is wound, each of said reels having a central aperture therein, and said drive means includes a drive shaft positionable in said central apertures of said reels.

60. The combination of claim 59, wherein said cartridges are positioned with said central apertures of one reel thereof in alignment, said drive shaft extends into said aligned apertures, and cooperating means on said drive shaft and said central apertures for interlocking said drive shaft with one reel in one of said cartridges to move the tape contained therein.

61. The combination of claim 60, wherein said flywheel is mounted for rotation on the same axis as said drive shaft and means are provided for disconnecting said drive shaft from said flywheel while maintaining said drive shaft interlocked with said one reel.

62. The combination of claim 61, wherein said disconnecting means includes a member secured to said drive shaft and a spring biased lever carried by said flywheel, said lever being normally positioned to engage said member and being movable to a position out of engagement with said member.

63. The combination of claim 62, wherein said member comprises a plate having at least one notch in the periphery thereof, and said lever includes a roller arranged to seat in said notch.

64. An apparatus for automatically playing magnetic tape cartridges, comprising a magazine, a plurality of magnetic tape cartridges positioned in predetermined relation in said magazine and each having a pair of reels on which a length of magnetic tape is wound with the ends thereof connected to said pair of reels, a drive shaft having means adapted to interlock with any one of said reels, means for positioning said magazine with said drive shaft interlocking means adapted to drive said one reel of one of said cartridges, means for rotating said drive shaft so that the tape in said one cartridge is wound on said one reel, automatic tripping means responsive to the increased load on said drive shaft when the end of the tape in said one cartridge is reached for initiating an automatic tape cartridge change cycle, and means operative during said change cycle for causing relative movement between said magazine and said interlocking means so that said interlocking means is positioned for engagement with a reel on a different one of said cartridges.

65. The apparatus of claim 64, which includes a gear, means on said magazine in engagement with said gear, and means operative during said change cycle for rotating said gear an amount sufficient to position said interlocking means for engagement with a reel on a different one of said cartridges.

66. The apparatus of claim 64, wherein said drive shaft extends vertically and said magazine is initially positioned so that said interlocking means is in engagement with the uppermost cartridge in said magazine.

67. The apparatus of claim 64, which includes manually operable reject means operable during periods when tape is being wound on one of said reels for moving said magazine relative to said interlocking means to position said interlocking means for engagement with a reel in a selected one of said cartridges.

68. The apparatus of claim 64, which includes means for indicating the position of said magazine with respect to said interlocking means.

69. The apparatus of claim 64, wherein the tape in said cartridges are successively played in the order in which said cartridges are arranged in said magazine, and means responsive to completion of play of the last cartridge in said magazine for moving said magazine to an unloading position

70. The apparatus of claim 69, wherein said drive shaft rotating means is disabled when said magazine is moved to said unloading position.

71. An apparatus for automatically playing magnetic tape cartridges, comprising a plurality of magnetic tape cartridges each containing a pair of reels on which a length of magnetic tape is wound, each of said reels having a central aperture therein and said cartridges having openings therein providing access to said central apertures, a drive shaft having means adapted to interlock with the central aperture of any one of said reels to drive the same, means for positioning said plurality of cartridges in spaced relation with said drive shaft extending into the central aperture of one reel in one of said cartridges so that the magnetic tape in said one cartridge is wound onto said one reel, and automatic cartridge changing means for causing relative movement between said plurality of cartridges and said drive shaft to position said interlocking means for driving a reel in a different one of said cartridges.

72. An apparatus as set forth in claim 71, wherein the ends of each tape are secured to said pair of reels in each of said cartridges and said automatic cartridge changing means is responsive to the increase in tension on said drive shaft when the end of the tape in said one cartridge is reached.

73. An apparatus as set forth in claim 71, which includes a transducer head, and said automatic cartridge changing means includes means for moving said head into engagement with said one tape during the period when said one tape is driven by said drive shaft.

74. An apparatus as set forth in claim 71, which includes a magazine adapted to position said plurality of cartridges at different locations therein, said magazine having openings in the ends thereof which permit one reel in each of said cartridges to be positioned over said drive shaft.

75. An apparatus as set forth in claim 77, which includes a positioning shaft spaced from said drive shaft by an amount equal to the spacing of said reels within said cartridges.

76. An apparatus as set forth in claim 71, wherein each of said cartridges is provided with top and bottom walls having aligned openings therein, and said pair of reels are loosely retained in said aligned openings.

77. An apparatus as set forth in claim 76, wherein each of said reels is provided with a hub portion through which said central aperture extends, said hub portions being loosely retained in said aligned openings.

78. An apparatus as set forth in claim 71, wherein said drive shaft includes a head portion provided with a projecting member which is adapted to interlock with the central aperture of any one of said reels.

79. An apparatus as set forth in claim 78, wherein said projecting member is spring biased to an outer position and said central aperture of each of said reels is provided with a series of vertically extending grooves therein adapted to receive said projecting member.

80. In an apparatus for automatically playing magnetic tape cartridges each having reel means on which a length of magnetic tape is wound, the combination of, a flywheel, means for rotating said flywheel, drive means normally connected to said flywheel for moving the tape in one of said cartridges, automatic tape cartridge changing means including a cycling member movable over a predetermined path during a tape cartridge changing cycle, means responsive to the completion of play of the tape in said one cartridge for disconnecting said flywheel from said drive means and connecting said flywheel to said cycling member, thereby to move said member over said predetermined path, and means responsive to movement of said member over said path for moving said drive means out of operative relation with said one cartridge and into operative relation with another of said cartridges.

81. The combination of claim 80, which includes a transducer head normally in engagement with the tape in said one cartridge, and means responsive to movement of said cycling member over said path for moving said head out of engagement with the tape in said one cartridge and into engagement with the tape in said other cartridge.

82. The combination of claim 80, wherein said cycling member is movable over said predetermined path during one revolution of said flywheel.

83. The combination of claim 80, which includes means responsive to completion of play of all of said cartridges for terminating rotation of said flywheel.

84. The combination of claim 80, wherein said drive means includes a drive shaft and said flywheel is mounted for rotation about the same axis as said drive shaft.

85. The combination of claim 84, wherein said drive shaft is mounted for rotation about a vertical axis.

86. The combination of claim 80, wherein said drive means includes a drive shaft and said cycling member is mounted for rotation about the same axis as said drive shaft.

87. The combination of claim 86, wherein said drive shaft, said cycling member and said flywheel are all three mounted for rotation about the same axis.

88. The combination of claim 87, wherein said axis extends vertically.

89. The combination of claim 86, wherein said drive shaft carries a drive assembly arranged to be selectively interlocked with said reel means in different ones of said cartridges.

90. The combination of claim 86, wherein said drive shaft is mounted for rotation about a vertical axis and extends through an aperture in said reel means in each of said cartridges.

91. The combination of claim 90, wherein said vertically extending drive shaft rides on a single ball bearing in engagement with the bottom end thereof.

92. The combination of claim 80, wherein said plurality of cartridges are positioned within a magazine, and means responsive to movement of said cycling member during a cartridge changing cycle for moving said magazine relative to said drive means.

93. The combination of claim 92, which includes means for limiting the total amount of movement of said magazine during successive cartridge changing cycles.

94. The combination of claim 92, which includes means responsive to the absence of a cartridge at a particular location in said magazine for moving said cycling member over said path until said drive means is positioned in operative relation with another cartridge in said magazine.

95. The combination of claim 92, which includes means for preventing movement of said magazine during periods when a tape in one of said cartridges is being played.

96. The combination of claim 92, which includes gear means responsive to movement of said cycling member during a cartridge changing cycle for moving said magazine relative to said drive means.

97. The combination of claim 96, which includes means for preventing movement of said gear means while the tape in one of said cartridges is being played.

98. The combination of claim 96, which includes detent means in engagement with said gear means for establishing a plurality of detented positions for said magazine.

99. The combination of claim 96, wherein said magazine is movable vertically, and said gear means includes a series of vertically extending teeth on said magazine and a gear mounted for rotation about a horizontal axis and engaging said teeth on said magazine.

100. The combination of claim 90, which includes detent means urged into engagement with the side of the teeth of said gear for establishing a plurality of detented positions for said magazine.

101. The combination of claim 99, which includes a locking pin normally positioned between two adjacent teeth of said gear, and means responsive to movement of said cycling member during a cartridge changing cycle for removing said pin from between said adjacent teeth, thereby to permit rotation of said gear.

102. The combination of claim 99, wherein said cycling member comprises a cam plate mounted for rotation about a vertical axis, and cam follower means in engagement with said cam plate for rotating said gear.

103. The combination of claim 102, wherein said cam follower means rotates said gear an amount equal to the circular pitch of the gear teeth on said gear.

104. The combination of claim 102, which includes means for disengaging said cam follower means from said gear when said magazine has been moved to a predetermined unloading position.

* * * * *

PO-1050
(5/69)

UNITED STATES PATENT OFFICE
CERTIFICATE OF CORRECTION

Patent No. 3,650,413 Dated March 30, 1972

Inventor(s) Morton L. Weigel

It is certified that error appears in the above-identified patent and that said Letters Patent are hereby corrected as shown below:

Column 29, line 38, "to" should read --so--;

Column 34, line 40, "relative movement between said magazine and said head" should read --moving said magazine--;

Column 37, line 31, "77" should read --71--;

Column 38, line 59, "90" should read --99--.

Signed and sealed this 18th day of July 1972.

(SEAL)
Attest:

EDWARD M.FLETCHER,JR.
Attesting Officer

ROBERT GOTTSCHALK
Commissioner of Patents